US011922346B2

(12) United States Patent
Aslam et al.

(10) Patent No.: US 11,922,346 B2
(45) Date of Patent: Mar. 5, 2024

(54) SYSTEM AND METHOD FOR SHIFT SCHEDULE MANAGEMENT

(71) Applicant: PAYACTIV INC., San Jose, CA (US)

(72) Inventors: Sohail Aslam, Milpitas, CA (US); Safwan Shah, Saratoga, CA (US); Anand P Narayan, Longmont, CO (US)

(73) Assignee: PAYACTIV, INC., San Jose, CA (US)

( * ) Notice: Subject to any disclaimer, the term of this patent is extended or adjusted under 35 U.S.C. 154(b) by 16 days.

(21) Appl. No.: 17/537,501

(22) Filed: Nov. 30, 2021

(65) Prior Publication Data

US 2022/0198353 A1 Jun. 23, 2022

Related U.S. Application Data

(60) Provisional application No. 63/128,040, filed on Dec. 19, 2020.

(51) Int. Cl.
G06Q 10/06 (2023.01)
G06Q 10/0631 (2023.01)
(Continued)

(52) U.S. Cl.
CPC ....... G06Q 10/06312 (2013.01); G06N 20/00 (2019.01); G06Q 10/063116 (2013.01);
(Continued)

(58) Field of Classification Search
CPC .......... G06Q 10/06312; G06Q 40/125; G06Q 10/063116; G06Q 10/1093; G06N 20/00; G06V 10/762
See application file for complete search history.

(56) References Cited

U.S. PATENT DOCUMENTS 5,459,657 A 10/1995 Wynn et al.
6,347,306 B1 2/2002 Swart
(Continued)

FOREIGN PATENT DOCUMENTS

AU 2015208671 A1 * 9/2016 ....... G06F 17/30551

OTHER PUBLICATIONS

Bao, Yixin, et al. "Online job scheduling in distributed machine learning clusters." IEEE Infocom 2018-IEEE Conference on Computer Communications. IEEE, 2018. (Year: 2018).*
(Continued)

Primary Examiner — Hamzeh Obaid
(74) Attorney, Agent, or Firm — Yantra Patents LLC; Anand P Narayan

(57) ABSTRACT

Implementations relate to methods and systems to identify problem shifts. In some implementations, a method includes obtaining a plurality of published shift schedules, each published shift schedule associated with a respective shift of a respective employer of one or more employers, wherein each published shift schedule includes a location attribute, industry code attribute, and week indicator attribute; for each published shift schedule, obtaining a corresponding time and attendance record; programmatically analyzing the published shift schedule and the corresponding time and attendance record to determine unscheduled shifts; and adding unscheduled shift data associated with one or more unscheduled shifts to a training corpus, wherein the unscheduled shift data includes two or more of an employer identifier, a location identifier, a shift identifier, an industry identifier, an employee identifier, a job type identifier; and applying a machine learning algorithm to the training corpus to determine a plurality of problem shifts.

9 Claims, 14 Drawing Sheets

(51) Int. Cl.
*G06N 20/00* (2019.01)
*G06Q 40/12* (2023.01)
*G06V 10/762* (2022.01)
*G06Q 10/1093* (2023.01)

(52) U.S. Cl.
CPC ....... *G06Q 10/1093* (2013.01); *G06Q 40/125* (2013.12); *G06V 10/762* (2022.01)

(56) References Cited

U.S. PATENT DOCUMENTS

| | | | |
|---|---|---|---|
| 8,401,884 B1 | 3/2013 | Kinney | |
| 8,666,795 B2 | 3/2014 | Cameron et al. | |
| 8,744,889 B1 | 6/2014 | Foss et al. | |
| 9,406,052 B2 | 8/2016 | Lakritz et al. | |
| 10,535,024 B1* | 1/2020 | Westland | G06Q 10/063116 |
| 10,572,844 B1* | 2/2020 | Westland | G06F 3/0482 |
| 11,232,410 B2* | 1/2022 | Srinivasan | G06F 11/0781 |
| 11,551,168 B1* | 1/2023 | Westland | G06Q 10/063116 |
| 2007/0111799 A1* | 5/2007 | Robb | G07F 17/3237 463/42 |
| 2010/0250343 A1* | 9/2010 | Lamoncha | G06Q 10/06398 707/E17.107 |
| 2013/0090968 A1 | 4/2013 | Borza | |
| 2015/0019214 A1* | 1/2015 | Wang | G06N 3/02 704/232 |
| 2015/0161553 A1* | 6/2015 | Eggleston | H04W 4/021 705/7.15 |
| 2016/0335694 A1* | 11/2016 | Catino | G06Q 30/0625 |
| 2016/0342929 A1* | 11/2016 | Tanaka | G06Q 10/06314 |
| 2017/0098181 A1 | 4/2017 | Herman et al. | |
| 2018/0158548 A1* | 6/2018 | Taheri | G06Q 10/1093 |
| 2019/0108469 A1* | 4/2019 | Limaj | G06Q 10/063116 |
| 2019/0244318 A1* | 8/2019 | Rajcok | H04W 4/029 |
| 2020/0073716 A1* | 3/2020 | Kaul | G06F 9/5005 |
| 2020/0111044 A1* | 4/2020 | New, Jr. | G06Q 10/063112 |
| 2020/0327478 A1* | 10/2020 | Balusani | G06Q 30/08 |
| 2021/0150451 A1* | 5/2021 | Jeong | G06Q 10/06312 |
| 2021/0199850 A1* | 7/2021 | Schmude | G06N 3/044 |
| 2022/0180276 A1* | 6/2022 | Silverman | G06Q 10/06315 |

OTHER PUBLICATIONS

Zhang D, Dai D, He Y, Bao FS, Xie B. RLScheduler: an automated HPC batch job scheduler using reinforcement learning. InSC20: International Conference for High Performance Computing, Networking, Storage and Analysis Nov. 9, 2020 (pp. 1-15). IEEE. (Year: 2020).*

* cited by examiner

200

210 215 220 225

Company ID: 281   Location ID:133        Industry code: A8   Week: 22

230

240

205

| Shift ID | SUN | MON | TUE | WED | THU | FRI | SAT |
|---|---|---|---|---|---|---|---|
| 1 | John/816 Nate/211 | Abby/181 Nate/211 | Jose/453 Nate/211 | Jose/453 Nate/211 | Jose/453 Nam/784 | John/816 Nam/784 | Nate/185 Nam/784 |
| 2 | Jose/453 | Abby/181 | Jose/453 | Jose/453 | Jose/453 | John/816 | Abby/181 |
| 3 | Jose/453 Lori/1811 | Nate/185 Lori/1811 | Abby/181 Lori/1811 | Abby/181 Josh/973 | Nate/185 Josh/973 | Nate/185 Josh/973 | Abby/181 Josh/973 |

Company ID: 281   Location ID:134        Industry code: A8   Week: 22

250

| Shift ID | SUN | MON | TUE | WED | THU | FRI | SAT |
|---|---|---|---|---|---|---|---|
| 1 | Tony/455 | Tony/455 | Tony/455 | Tony/455 | Tony/455 | Tony/455 | Mary/865 |
| 2 | Eby/234 | Tien/188 | Tien/188 | Eby/234 | Tien/188 | Eby/234 | Mary/865 |
| 3 | Mary/865 | Mary/865 | Mary/865 | Mary/865 | Bart/678 | Bart/678 | Bart/678 |

Company ID: 455   Location ID:211        Industry code: B6   Week: 22

260

| Shift ID | SUN | MON | TUE | WED | THU | FRI | SAT |
|---|---|---|---|---|---|---|---|
| 1 | Toto/455 | Omar/488 | Xi/123 | Xi/123 | Xi/123 | Xi/123 | Toto/455 |
| 2 | Toto/455 | Omar/488 | Xi/123 | Xi/123 | Xi/123 | Xi/123 | Toto/455 |
| 3 | Toto/455 | Tito/877 | Omar/488 | Omar/488 | Omar/488 | Omar/488 | Toto/455 |
| 4 | Xi/123 | Tito/877 | Omar/488 | Omar/488 | Omar/488 | Omar/488 | Tito/877 |

| Company ID: 281 | | Location ID:133 | | Industry code: A8 | | Week: 22 |
|---|---|---|---|---|---|---|
| Shift ID | SUN | MON | TUE | WED | THU | FRI | SAT |
| 1 | John/816 Josh/973 | Abby/181 Nate/211 | Jose/453 Nate/211 | Jose/453 Nate/211 | Jose/453 Nate/211 | John/816 Nam/784 | Nate/185 Nam/784 |
| 2 | Jose/453 | Abby/181 | Jose/453 | Jose/453 | Jose/453 | John/816 | Abby/181 |
| 3 | Jose/453 Lori/1811 | Nate/185 | Abby/181 Josh/973 | Abby/181 Josh/973 | Nate/185 Josh/973 | Abby/181 Josh/973 | Abby/181 Josh/973 |

| Company ID: 281 | | Location ID:134 | | Industry code: A8 | | Week: 22 |
|---|---|---|---|---|---|---|
| Shift ID | SUN | MON | TUE | WED | THU | FRI | SAT |
| 1 | Tony/455 | Tony/455 | Tony/455 | Tony/455 | Tony/455 | Tony/455 | Mary/865 |
| 2 | Eby/234 | Tien/188 | Tien/188 | Eby/234 | Tien/188 | Eby/234 | Mary/865 |
| 3 | Mary/865 | Mary/865 | Mary/865 | Mary/865 | Bart/678 | Tien/188 | Bart/678 |

315

| Company ID: 455 | | Location ID:211 | | Industry code: B6 | | Week: 22 |
|---|---|---|---|---|---|---|
| Shift ID | SUN | MON | TUE | WED | THU | FRI | SAT |
| 1 | Toto/455 | Omar/488 | Xi/123 | Xi/123 | Xi/123 | Xi/123 | Toto/455 |
| 2 | Toto/455 | Omar/488 | Xi/123 | Xi/123 | Xi/123 | Xi/123 | Toto/455 |
| 3 | Toto/455 | Tito/877 | Omar/488 | Omar/488 | Omar/488 | Omar/488 | Toto/455 |
| 4 | Xi/123 | Tito/877 | Omar/488 | Omar/488 | Omar/488 | | Tito/877 |

SYSTEM AND METHOD FOR SHIFT SCHEDULE MANAGEMENT

CROSS-REFERENCE TO RELATED APPLICATION

This application claims priority to U.S. Provisional Patent Application No. 63/128,040, filed Dec. 19, 2020, titled "SYSTEM AND METHOD FOR SHIFT SCHEDULE MANAGEMENT" and which is incorporated by reference herein in its entirety.

TECHNICAL FIELD

Implementations relate generally to operations planning, shift rostering, and to automatically determine problem shifts by applying machine learning techniques.

BACKGROUND

Efficient functioning of an organization requires efficient staffing for various tasks and functions within the organization. Work schedules are commonly created to plan tasks and functions within an organization.

Even with schedules and planned calendars, for various reasons, employees are not always able to attend a scheduled shift, necessitating alternate arrangements on part of the employer/organization, e.g., last minute scheduling of a different employee than the original employee who was scheduled, a shift swap with another employee, needing a supervisor to perform the tasks of an absentee associate, etc. In many cases, the missed shifts can follow patterns across an industry type, location, season, etc., that may not be apparent at an individual level. Automated determination of problem shifts across large datasets of schedule data, and automated methods for incentivizing employees to attend can improve business productivity.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to identify problem shifts using machine learning. The computer-implemented method also includes obtaining a plurality of published shift schedules, each published shift schedule associated with a respective shift of a respective employer of one or more employers, where each published shift schedule includes a location attribute, industry code attribute, and week indicator attribute; for each published shift schedule, obtaining a corresponding time and attendance record; programmatically analyzing the published shift schedule and the corresponding time and attendance record to determine one or more unscheduled shifts; and adding unscheduled shift data associated with the one or more unscheduled shifts to a training corpus, where the unscheduled shift data includes two or more of an employer identifier, a location identifier, a shift identifier, an industry identifier, an employee identifier, a job type identifier. The method also includes applying a machine learning algorithm to the training corpus to determine a plurality of problem shifts. Other embodiments of this aspect include corresponding computer systems, apparatus, and computer programs recorded on one or more computer storage devices, each configured to perform the actions of the methods.

Implementations may include one or more of the following features. The computer-implemented method where applying the machine learning algorithm to the training corpus may include determining a shift compliance metric for each problem shift. Applying the machine learning algorithm to the training corpus may include applying a logistic regression model to the training corpus. Applying a machine learning algorithm to the training corpus may include applying the machine learning algorithm to at least 400 published shift schedules. Determining the plurality of problem shifts may include: identifying one or more decision boundaries based on logistic regression values; comparing a distance of a logistic regression value associated with each of a plurality of shifts to the one or more decision boundaries; and determining the plurality of problem shifts based on the comparison. Obtaining the corresponding time and attendance data may include receiving the corresponding time and attendance data as a csv file or via an api. Applying a machine learning algorithm to the training corpus may include applying a clustering algorithm to generate a plurality of clusters of problem shifts. The computer-implemented method may include computing a centroid value of each cluster of the plurality of clusters of problem shifts. The computer-implemented method may include: receiving a shift schedule template that includes a newly created shift; computing a distance between the newly created shift and each of the plurality of clusters; determining a cluster associated with the newly created shift based on the corresponding distances; and providing a notification of a type of shift of the newly created shift. Implementations of the described techniques may include hardware, a method or process, or computer software on a computer-accessible medium.

One general aspect includes a computer-implemented method to support evaluation of an incentive structure for resolving problem shifts. The computer-implemented method also includes obtaining a shift schedule template; identifying a plurality of problem shifts in the shift schedule template; instantiating a graphical user interface (GUI) portion on a plurality of user devices; displaying a randomized incentive offer for each of the identified problem shifts via the GUI; receiving shift bids from a set of users via one or more of the plurality of user devices; publishing a shift schedule based on the received shift bids; obtaining time and attendance data associated with the published shift schedule; obtaining historical problem shift data; and statistically analyzing the time and attendance data, the historical problem shift data, and the published shift schedule to determine a statistical shift compliance metric associated with the randomized incentive. Other embodiments of this aspect include corresponding computer systems, apparatus, and computer programs recorded on one or more computer storage devices, each configured to perform the actions of the methods.

Implementations may include one or more of the following features. The computer-implemented method where identifying a plurality of problem shifts may include: obtaining a plurality of published shift schedules, each published shift schedule associated with a respective shift of a respective employer of one or more employers, where each published shift schedule includes a location attribute, industry code attribute, and week indicator attribute; for each published shift schedule, obtaining a corresponding time and attendance record; programmatically analyzing the published shift schedule and the corresponding time and attendance record to determine one or more unscheduled shifts; and adding unscheduled shift data associated with the one or more unscheduled shifts to a training corpus, where the unscheduled shift data includes two or more of an employer identifier, a location identifier, an industry identifier, an employee identifier, a job type identifier; and applying a machine learning algorithm to the training corpus to determine a plurality of problem shifts. Displaying the randomized incentive offer may include displaying one or more of a timely pay offer and a bonus pay offer. The computer-implemented method may include: receiving an indicator of shift completion of a shift associated with the randomized incentive offer; and fulfilling the randomized incentive offer. Statistically analyzing the time and attendance data, the historical problem shift data, and the published shift schedule statistical analysis may include measuring a lift associated with the randomized incentive offer. Statistically analyzing the time and attendance data, the historical problem shift data, and the published shift schedule may include measuring a distance of movement of a centroid of each cluster of a plurality of clusters of problem shift data. Implementations of the described techniques may include hardware, a method or process, or computer software on a computer-accessible medium.

One general aspect includes a computer-implemented method to improve shift coverage. The computer-implemented method also includes receiving a shift schedule template; identifying a plurality of problem shifts in the shift schedule template, determining an incentive offer for each problem shift, instantiating a graphical user interface (GUI) portion on a plurality of user devices, displaying the incentive offer for each of the identified problem shifts via the GUI, receiving shift bids from each of a set of users via one of more user devices of the plurality of user devices, and adjusting a shift schedule based on the received shift bids to generate a published shift schedule. Other embodiments of this aspect include corresponding computer systems, apparatus, and computer programs recorded on one or more computer storage devices, each configured to perform the actions of the methods.

Implementations may include one or more of the following features. The computer-implemented method may include: obtaining time and attendance data corresponding to the published shift schedule; identifying a token associated with timely pay; and accelerating payment to a user based on the identified token. Identifying a plurality of problem shifts may include: obtaining a plurality of published shift schedules, each published shift schedule associated with a respective shift of a respective employer of one or more employers, where each published shift schedule includes a location attribute, industry code attribute, and week indicator attribute; for each published shift schedule, obtaining a corresponding time and attendance record; programmatically analyzing the published shift schedule and the corresponding time and attendance record to determine one or more unscheduled shifts; and adding unscheduled shift data associated with the one or more unscheduled shifts to a training corpus, where the unscheduled shift data includes two or more of an employer identifier, a location identifier, an industry identifier, an employee identifier, a job type identifier; and applying a machine learning algorithm to the training corpus to determine a plurality of problem shifts. The incentive offer is a bonus pay offer, and where an amount associated with the bonus pay offer is based on a logistic regression value associated with the problem shift. The GUI enables a user to submit a shift bid. The shift bid is an indication of acceptance of the incentive offer by the user. Shift bid is a response of a monetary amount or a percentage entered by a user on a respective user device. The computer-implemented method may include: calculating a reception level for the each incentive offer based on a count of users that view one or more incentive offers. The computer-implemented method may include: comparing the reception level for a particular shift to a first threshold level; comparing received shift bids for the particular shift to a second threshold; based on a determination of a reception level meeting the first threshold and the received shift bids meeting a second threshold level; determining an updated incentive offer; and displaying the updated incentive offer on the user devices. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving a shift schedule template; identifying a plurality of problem shifts in the shift schedule template; determining an incentive offer for each problem shift; instantiating a graphical user interface (GUI) portion on a plurality of user devices; displaying the incentive offer for each of the identified problem shifts via the GUI; receiving shift bids from each of a set of users via one of more user devices of the plurality of user devices; and adjusting a shift schedule based on the received shift bids to generate a published shift schedule. Other embodiments of this aspect include corresponding computer systems, apparatus, and computer programs recorded on one or more computer storage devices, each configured to perform the actions of the methods.

Implementations may include one or more of the following features. The system where identifying a plurality of problem shifts may include: obtaining a plurality of published shift schedules, each published shift schedule associated with a respective shift of a respective employer of one or more employers, where each published shift schedule includes a location attribute, industry code attribute, and week indicator attribute; for each published shift schedule, obtaining a corresponding time and attendance record; programmatically analyzing the published shift schedule and the corresponding time and attendance record to determine one or more unscheduled shifts; and adding unscheduled shift data associated with the one or more unscheduled shifts to a training corpus, where the unscheduled shift data includes two or more of an employer identifier, a location identifier, an industry identifier, an employee identifier, a job type identifier; and applying a machine learning algorithm to the training corpus to determine a plurality of problem shifts. The operations further may include: obtaining time and attendance data corresponding to the published shift schedule; identifying a token associated with timely pay; and accelerating payment to a user based on the identified token. Implementations of the described techniques may include hardware, a method or process, or computer software on a computer-accessible medium.

BRIEF DESCRIPTION OF THE DRAWINGS

FIG. 2 illustrates an example of shift schedule data records, in accordance with some implementations.

FIG. 3 illustrates an example of time and attendance data records, in accordance with some implementations.

DETAILED DESCRIPTION

Figure 1A:
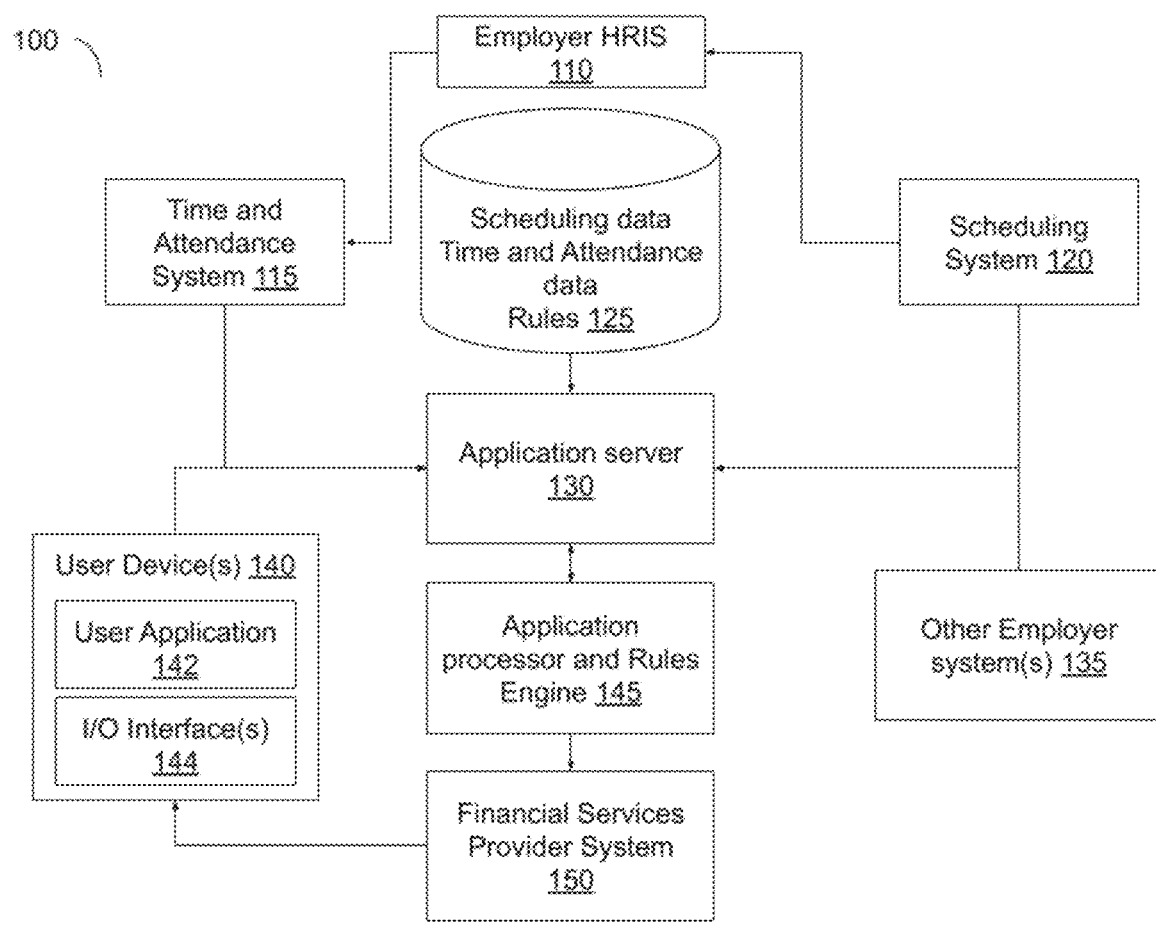
FIG. 1A is a diagram of an example system environment to automatically determine problem shifts, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be implemented in connection with other implementations whether or not explicitly described.

Many businesses include operations that are organized by shifts—e.g., restaurants, airline companies, nursing homes, manufacturing units, retail establishments, etc. Shift workers are common in many industries. In such businesses, business operations commonly utilize a shift roster and/or shift schedule that specifies the employee(s)/worker(s) who are scheduled to "work the shift." Shift schedules are utilized to plan an organization's activities, and for employers, employees, contractors, workers to plan ahead and be aware of their schedule(s).

Large enterprises commonly utilize automated scheduling that may be verified by human users. The scheduling system may be an automated system that is integrated with other computer systems within an organization, e.g., Enterprise resource planning (ERP) systems, Customer relations management (CRM) systems, that may be utilized for providing business intelligence about demand, customer visits, etc. The shift schedules are commonly prepared well in advance of the actual shift and take into account worker/employee/contractor availability and eligibility, business needs, regulatory provisions, etc.

In some implementations, employees are enabled to clock in and clock out with just their user devices. User authentication of the user device and geolocation features are utilized to further authenticate clock in and clock out actions. The user devices may also be integrated with time and attendance system(s) and user provided information may be utilized for processing timesheets, payroll, etc. In some implementations, rostering and payroll may be integrated into a single system that is implemented across multiple business units, locations, etc.

Despite the planning efforts, call-offs, where an employee calls off their shift, uncommunicated absences, shift swaps, etc. are common, which can cause a loss of revenue, loss of business productivity, reduced customer satisfaction, reduced employee morale, etc. Analytics can provide insights into determining patterns across industries, locations, and additionally suggest mitigating measures.

In a franchise setting, a local franchisee operator may experience absenteeism and excessive call-offs. Determining a pattern at the local level may pose a challenge. A service for automated scheduling with analytics that reveal effects of incentives on absenteeism and call-offs may help operators of business across multiple locations.

In many workplaces, gig workers and contract workers are common. Interaction with them if increasingly via their user devices, which is also integrated into scheduling, payroll etc.

Employer and HR service providers offer a variety of ways and/or platforms for users (e.g., employees, contractors, hourly workers) to interact with one another. For example, users of a platform may work together towards a common goal, sign up for training, earn rewards based on work accomplishments, send electronic messages to one another, and so forth.

In some implementations, a communication channel (employee communication system) may be provided to connect employees with one another, institute and maintain rewards programs, promote employee engagement, etc. The communication channels can include a platform-enabled communication system which is a channel provided through a platform provided by an employer or a service provider associated with one or more employers. In such a channel, all communication between participants are typically routed through the platform, e.g., via an application server hosted by a service provider.

The communication channels can also include platform-enabled audio communication. The platform may additionally support voice communication by providing services such as speech-to-text, subtitles, sign language support etc. A record of all or some of user communications can be stored on storage devices and/or media associated with the platform.

A technical problem for shift schedule managers is predictability of shift schedule filling and across platform(s). When the shifts include shifts from multiple job categories across multiple industries and locations, there are challenges to predictability since it may not be easy to automatically observe patterns of unscheduled shifts, since the patterns can be dependent on various parameters.

Some implementations disclosed herein automatically determine problem shifts—shifts with a high likelihood of being missed and are highlighted to one or more users. In some implementations, automated actions may be recommended and/or taken to mitigate the occurrence of problem shifts.

FIG. 1A is a diagram of an example system environment to automatically determine problem shifts, in accordance with some implementations.

FIG. 1A illustrates an example system environment 100, in accordance with some implementations of the disclosure. FIG. 1A and the other figures use like reference numerals to identify like elements. A letter after a reference numeral, such as "140a" indicates that the text refers specifically to the element having that particular reference numeral. A reference numeral in the text without a following letter, such as "140," refers to any or all of the elements in the figures bearing that reference numeral (e.g., "140" in the text refers to reference numerals "140a," "140b," and/or "140n" in the figures).

The system environment 100 (also referred to as "system" herein) includes application server 130, data store 125 that includes storage for scheduling data, time and attendance data, and rules data, user devices 140 (generally referred to as "user device(s) 140" herein), an employer human resource information system (HRIS) 110, a Time and Attendance system 115, a scheduling system 120, other employer system(s) 135, a financial services provider system 150, and application processor and rules engine 145, all of which are coupled via a network.

A user device 140 can include a user application 142, and input/output (I/O) interfaces (e.g., input/output devices). The input/output devices can include one or more of a microphone, speakers, headphones, display device, mouse, keyboard, touchscreen, virtual reality consoles, etc.

System environment 100 is provided for illustration. In different implementations, the system environment 100 may include the same, fewer, more, or different elements configured in the same or different manner as that shown in FIG. 1A.

In some implementations, the data store 125 may be a non-transitory computer readable memory (e.g., random access memory), a cache, a drive (e.g., a hard drive), a flash drive, a database system, or another type of component or device capable of storing data. The data store 125 may also include multiple storage components (e.g., multiple drives or multiple databases) that may also span multiple computing devices (e.g., multiple server computers). In some implementations, data store 125 may include cloud-based storage.

In some implementations, the Application server 130 can include a server having one or more computing devices (e.g., a cloud computing system, a rackmount server, a server computer, cluster of physical servers, etc.). In some implementations, the Application server 130 may be an independent system, may include multiple servers, or be part of another system or server.

In some implementations, the Application server 130 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the Application server 130 and to provide a user with access to Application server 130. The Application server 130 may also include a website (e.g., a webpage) or application back-end software that may be used to provide a user with access to content provided by Application server 130. For example, users may access Application server 130 using the user application 142 on user devices 140.

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in an employer or service provider system may be considered a "user."

It may be noted that the Application server 130 is provided for purposes of illustration. In some implementations, Application server 130 may host one or more media items that can include communication messages from one user to one or more other users. With user permission and express user consent, the Application server 130 may analyze communication data to improve the communication system. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, device(s) 130 and 140 may each include computing devices such as servers, cloud-based computers, personal computers (PCs), mobile devices (e.g., laptops, mobile phones, smart phones, tablet computers, or netbook computers), network-connected televisions, etc. In some implementations, one or more user devices 140 may connect to the Application server 130 at any given moment. It may be noted that the number of user devices 140 is provided as illustration. In some implementations, any number of user devices 140 may be used.

In some implementations, each user device 140 may include an instance of the user application 142, respectively. In one implementation, the user application 142 may permit users to use and interact with Application server 130, such as request a shift in a calendar application hosted by Application server 130, or view or upload content, images, video items, web pages, documents, and so forth via I/O interfaces 144. In one example, the user application may be a web application (e.g., an application that operates in conjunction with a web browser) that can access, retrieve, present, or navigate content (e.g., a training module etc.) served by a web server. In another example, the user application may be a native application (e.g., a mobile application, app, or a program) that is installed and executes locally on user device 140 and allows users to interact with Application server 130. The user application may render, display, or present the content (e.g., a web page, a media viewer) to a user. In an implementation, the user application may also include an embedded media player (e.g., a Flash® player) that is embedded in a web page.

According to aspects of the disclosure, the user application may be an online application for users to build, create, edit, upload content to the Application server 130 as well as interact with Application server 130. As such, the user application may be provided to the device(s) 110 by the Application server 130. In another example, the user application may be an application that is downloaded from a server.

In some implementations, a user may login to Application server 130 via the user application. The user may access a user account by providing user account information (e.g., username and password) where the user account is associated with one or more accounts created on Application server 130.

In general, functions described in one implementation as being performed by the Application server 130 can also be performed by the device(s) 110, or a server, in other implementations if suitable. In addition, the functionality attributed to a particular component can be performed by different or multiple components operating together. The Application server 130 can also be accessed as a service provided to other systems or devices through appropriate application programming interfaces (API), and thus is not limited to use via browsers and in websites.

Figure 1B:
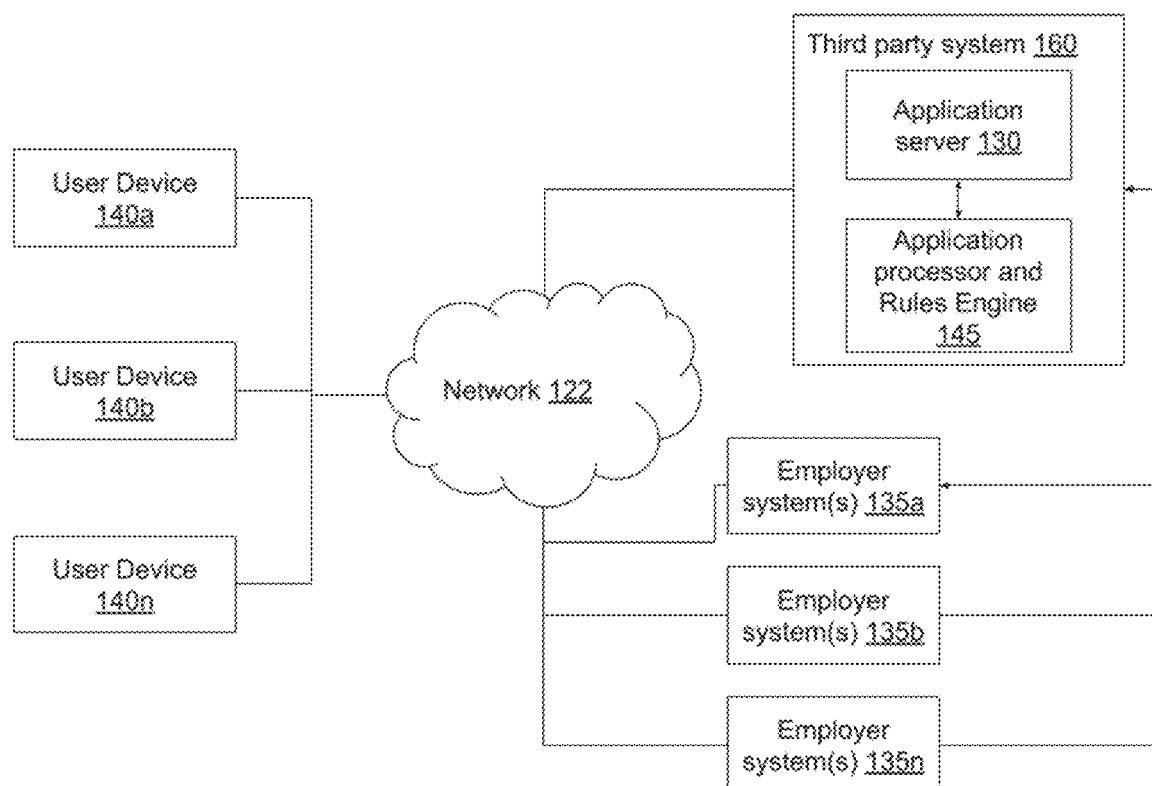
FIG. 1B is a diagram of an example system environment to automatically determine problem shifts, in accordance with some implementations.

FIG. 1B is a diagram of an example system environment to automatically determine problem shifts, in accordance with some implementations.

In this illustrative example, services are provided by third-party system 160 that offers services to one or more employers via respective employer systems 135 that are connected to the third-party system via network 122. Third party system is also connected to user devices 140 via network 122. The third-party system includes, among other components, application server 130 and application processor and rules engine.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a 5G network, a Long Term Evolution (LTE) network, etc.), routers, hubs, switches, server computers, or a combination thereof.

In some implementations, work schedules are displayed on user devices, which may also be utilized for maintaining time and attendance, e.g., clocking-in and clocking-out, etc. In addition, the user devices may be a channel for employees to request updates to schedules, requesting of new shifts, etc.

In some implementations, Application server 130 may include a messaging system or a type of social network that provides connections between users or that allows users (e.g., end-users or consumers) to communicate with other users on the Application server 130, where the communication may include voice chat, video chat, or text chat (e.g., 1:1 and/or N:N synchronous and/or asynchronous text-based communication). With user permission, a record of user communications may be stored in data store 125. The data store 125 may be utilized to store message transcripts (text, audio, images, etc.) exchanged between users.

In some implementations, content is generated via user application 142 and is stored in data store 125. When the user permits storage of message transcripts, the message transcripts may include the message content and associated metadata, e.g., text content of each message having a corresponding sender and recipient(s); message formatting (e.g., bold, italics, loud, etc.); message timestamps; relative locations of employees, etc.

FIG. 2 illustrates an example shift schedule, in accordance with some implementations.

A shift schedule (shift roster) specifies planned staffing for different shifts. The shift schedule may be automatically created by a software application (e.g., by an employer HRIS described with respect to FIG. 1A), or be prepared with human intervention. The shifts schedule may be shared with employees and/or supervisors and may be stored in paper and electronic form.

In this illustrative example, multiple shift schedules 200 of different employers are depicted. It will be appreciated that this is an example format for a shift schedule, and many variants of a shift schedule can be prepared that include similar features and attributes.

As depicted in FIG. 2, each shift schedule record includes a company identifier 210, a location identifier 215, an industry code 220, an indicator of time of year (week/date/season) 225, a shift (shift slot) identifier 230, and the roster 240 of employees, workers, or contractors scheduled to work during the indicated shift. The shift schedule may include a combination of name and/or employee identifier of the personnel scheduled for the shift.

In this illustrative example, three shift schedules are depicted, and two are shifts schedules of different locations for the same employer.

The attributes depicted in FIG. 2 are for illustrative purposes. In some implementations, other attributes may be included, and some attributes depicted here may be excluded. For example, a job type identifier may be mapped within a data structure to an employee identifier, and hence may not be included in a shift schedule data record. In other examples, it may be explicitly included in the shift schedule data record. In some implementations, the industry code may not be directly included in the shift schedule, but can be separately mapped to the employer identifier.

In the case of a third-party service, schedules from multiple employers may be received. The schedule(s) may be received via an Application Program Interface (API) or as files.

A process by which the schedule data can be obtained can vary based on the situation and use-case. For single employer systems, the schedule data may be data internal to an employer, and which is shared for analytics. In the case of analytics services provided by providers of human resource and allied services to multiple employers, the shift schedule data may be stored as multi-tenant data within computer systems of the third-party provider.

FIG. 3 illustrates an example time and attendance data record in accordance with some implementations.

The time and attendance data record can originate from one or more computer systems utilized by an organization. In some implementations, they are generated by a same system that generates a shift schedule. In some implementations, this may be generated by a different system than the one that generates a shift schedule. The time and attendance report/data record is typically utilized by payroll systems, e.g., for determining wages accrued to an employee over a pay period, etc., and serves as a basis for recording time and hours actually worked by an employee, as opposed to a schedule, which is a plan.

Time and attendance data may be obtained automatically from a timekeeping system(s), from one or more user device(s), from other computer systems, other biometric system(s), or shift data compiled with human intervention and/or approved by a supervisor.

In some implementations, the time and attendance data may be provided in real-time, where a time and attendance data record is generated as soon as a shift ends, and transmitted to employer and/or third party computer system (s).

In some implementations, the time and attendance data may be transmitted in a batch mode, e.g., at the end of a day, at the end of a predefined clocking period, etc. The time and attendance may be stored at one or more storage locations, e.g., on an employer computer system, at a service provider computer system, or for example, at data store 125.

The time and attendance data record reflects employee absences from a shift, e.g., when a worker calls-off their shift, or participates in a shift swap, e.g., when an employee swaps their shift with another employee, etc.

For example, as depicted in FIG. 2, in shift schedule data record 205, while John and Nate were scheduled for Shift 1 on Sunday in shift schedule slot 240, the corresponding time and attendance data record 305 is indicative of John and Josh actually working the shift, as indicated by a record associated with shift slot 310.

Similarly, shift schedule data record 260 is indicative of Omar being scheduled for shift slot 265, while the corresponding time and attendance data record 325 is indicative of no one working the shift slot 330.

Figure 4:
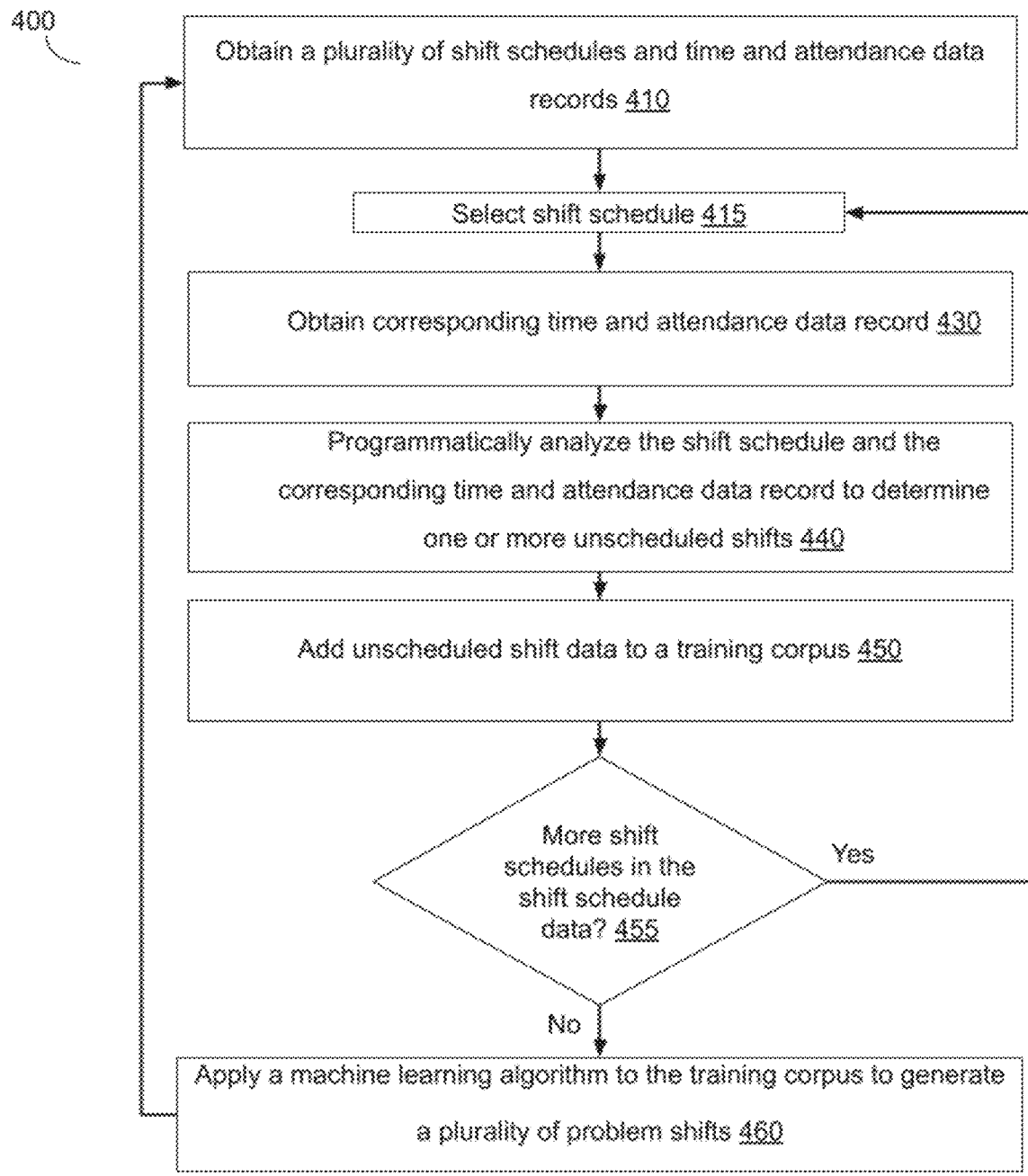
FIG. 4 is a flowchart illustrating an example method to identify problem shifts, in accordance with some implementations.

FIG. 4 is a flowchart illustrating an example method to identify problem shifts, in accordance with some implementations.

In some implementations, method 400 can be implemented, for example, on application server 130 described with reference to FIG. 1A. In some implementations, some or all of the method 400 can be implemented on one or more user devices 140 as shown in FIG. 1A, or on one or more server device(s) 130, and/or on a combination of server device(s) and client device(s). In described examples, the implementing system includes one or more digital processors or processing circuitry ("processors"), and one or more storage devices (e.g., a datastore 125 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

Method 400 may begin at block 410. At block 410, a plurality of shift schedule data records and a plurality of time and attendance data records are obtained.

The shift schedule data records may be similar to, for example, shift schedule data records 200 described with respect to FIG. 2, and can include shift schedule data from multiple employers, and multiple locations of those employers for a variety of dates. The shift schedule data may be obtained from an employer HRIS, for example, similar to employer HRIS 110 described with respect to FIG. 1A, and/or from a scheduling system 120 described with respect to FIG. 1A.

In some implementations, each shift schedule is associated with a respective shift of a respective employer of one or more employers, and each shift schedule includes one or more of an employer attribute, a location attribute, a time indicator (week, season, etc.) attribute.

The time and attendance data records may be similar to, for example, time and attendance data records 300 described with respect to FIG. 3. The time and attendance data records may be obtained, for example, from a time and attendance system 115 or other employer systems 135.

The shift schedule data and the time and attendance data may be received as a text file (CSV, Excel, XML, JSON, etc.), via a secured file sharing protocol, or via an API.

Block 410 may be followed by block 415. At block 415, a shift schedule of the plurality of shift schedules is selected. Block 415 may be followed by block 430.

At block 430, a time and attendance data record corresponding to the selected shift schedule is obtained from the plurality of obtained time and attendance data records. Block 430 may be followed by block 440.

At block 440, the selected shift schedule data and the corresponding time and attendance data record are programmatically analyzed to determine any unscheduled shifts in the record, e.g., any shift where the employee identifier in the time and attendance is different from the employee identifier for the corresponding shift in the schedule data. Unscheduled shifts may include swapped shifts, called-off shifts, and shifts that remained unfilled due to an employee absence. Block 440 may be followed by block 450.

At block 450, data records associated with the unscheduled shifts are added to a training corpus. Block 450 may be followed by block 455.

At block 455, it is determined whether there are additional shift schedules to be processed. If it is determined that there are more (additional) shift schedules to be processed, processing proceeds to block 415, else processing proceeds to block 460.

At block 460, a machine learning (ML) algorithm is applied to the training corpus to determine problem shifts and/or a shift compliance metric.

In some implementations, the ML model may be a supervised ML model that utilizes a logistic regression based architecture that converts shift schedule data to vectors. For example, the architecture may be utilized to map data in the shift schedule to vectors of real numbers.

In some implementations, the ML model utilizes techniques to reduce the dimensionality of the feature vector space, e.g., from a vector space that is characterized by many dimensions per shift to a vector space with a lower dimension.

For example, the ML model may determine a feature vector (or embedding) based on the shift schedule data. The feature vector (or embedding) may be a mathematical, multi-dimensional representation that is generated based on the shift schedule data. Different shifts may have different feature vectors, based on their respective data sets that include the particular shift. The trained ML model generates similar feature vectors for similar shifts.

In some implementations, the machine learning algorithm applied to the training corpus may include a logistic regression model to the training corpus. Two or more attributes in the shift schedule data, e.g., employer identifier, shift identifier, job identifier, employee identifier, location identifier, time (day, week of year, etc.) identifier may be utilized to determine a feature vector associated with each shift schedule.

In some implementations, one or more attributes may be pre-processed before construction of a feature vector. For example, a shift identifier received as an ordinal identifier (e.g., shift 1, shift 2, etc.) may be normalized across employers by converting the ordinal identifier to a continuous (time based) identifier, e.g., by identifying the shifts by a time of day corresponding to the shift. In some implementations, the shifts may be categorized into 15-minute units (chunks), hourly chunks, two hourly chunks, into 8 time periods in a day, etc. This may enable comparison of shift data across multiple employers, each of whom may utilize a different notation and/or breakdown for shifts.

In some implementations, categorical attributes, e.g., employer identifier, job type identifier, etc. may be modelled by using a sparse vector structure. For example, in a case with 3 employers, Employer-1, Employer-2, Employer-3, the feature vector portion for a shift schedule data record associated with Employer-1 may be constructed using attributes [1, 0, 0] for [Employer-1, Employer-2, Employer-3].

In some implementations, the machine learning algorithm is applied to at least about 400 published shift schedules for accuracy of determination of shift compliance metrics and problem shifts. In some implementations, a minimum size for the training corpus may be about 1000, about 10000, or about 10000 published shift schedules.

In some implementations, a minimum size for the training corpus may be based on the number of unscheduled shifts in the data records.

Application of the ML model is utilized to determine a shift compliance metric (odds of a shift being a problem shift), expressed as a number between 0 and 1, where 0 is indicative of a shift unlikely to be missed by an employee scheduled to work the shift, and where 1 represents a shift that is highly likely (e.g., almost definitely) to be missed.

In some implementations, decision boundaries based on the logistic regression values may be utilized to create clusters of problem shifts. For example, in some implementations, a decision boundary may be set aligned to points that correspond to 0.25, 0.5, and 0.75 as hard to fill, moderate to fill, and easy to fill shifts, respectively.

For example, in some implementations, a decision boundary may be set at points that correspond to 0.15, 0.5, and 0.95 as hard to fill, moderate to fill, and easy to fill shifts, respectively.

Easy to fill shifts may be shifts with a relatively low occurrence (incidence) of unscheduled shifts. For example, mid-day-health industry shifts, mid-week health industry shifts, weekend shifts in the restaurant industry may be easy to fill shifts in some data sets.

Hard to fill shifts may be shifts with a relatively high occurrence (incidence) of unscheduled shifts. For example, early in the week shifts in the restaurant industry, weekend shifts in the health industry, may be identified by the ML techniques as hard to fill shifts in some data sets.

In some implementations, different variants of clusters may be determined based n the logistic regression values and the shift attributes. For example, clusters may be formed that correspond to a single employer, a single region, etc.

In some implementations, the applied machine learning technique may be a K nearest neighbor technique. Each shift schedule data record in the training corpus is classified by a majority vote of its neighbors, with the record being assigned to the class most common amongst its K nearest neighbors measured by a distance function that is evaluated for the attributes in the shift schedule data. In some implementations, the distance function is a Hamming distance.

Once the records are classified, problem shifts are determined based on the shift compliance metric of a majority of the neighbors.

In some implementations, a plurality of clusters of problem shifts is created. A centroid value may be determined for each cluster of the plurality of clusters of problem shifts.

In some implementations, the shift compliance metric and/or clusters of problem shifts may be utilized to categorize newly created shifts (shift slots). For example, a likely cluster for a newly created shift slot may be evaluated. In an example, a shift schedule template is received that includes a new shift, e.g., new employer, new location, new industry, new job type, etc.

A distance is computed between the newly created shift and each of the plurality of clusters. A likely cluster associated with the newly created shift may be determined based on the corresponding distances. In some implementations, a notification of a type of shift of the newly created shift may be provided to one or more users.

In some implementations, a number of the plurality of clusters may be determined using an elbow method. In some implementations, a second clustering algorithm may be applied to the training corpus to detect one or more employer specific problem shifts.

Block 460 may be followed by block 410.

Method 400, or portions thereof, may be repeated any number of times using additional inputs. In some implementations, the problem shifts may be determined at a predetermined frequency, e.g., daily, weekly, etc. In some implementations, method 400 may be triggered by arrival of fresh data sets from one or more employer(s) and/or employer system(s).

In some implementations, method 400, or portions thereof, may be repeated based on employer updates, e.g., policy changes, management changes, etc. In some implementations, method 400, or portions thereof, may be repeated based on system updates, e.g., upon a certain number of completed shifts in a particular time period, upon a certain number of missed shifts in a particular time period and/or since the last analysis, etc. In some implementations, method 400, or portions thereof, may be repeated based on changes in observed statistics on the platform.

Method 400, or portions thereof, may be performed in a different order from that depicted in FIG. 4. For example, the time and attendance data records may be obtained first, and selected and corresponding schedule data obtained, and the loop may be performed over different records of time and attendance until all records matches are processed.

Figure 5:
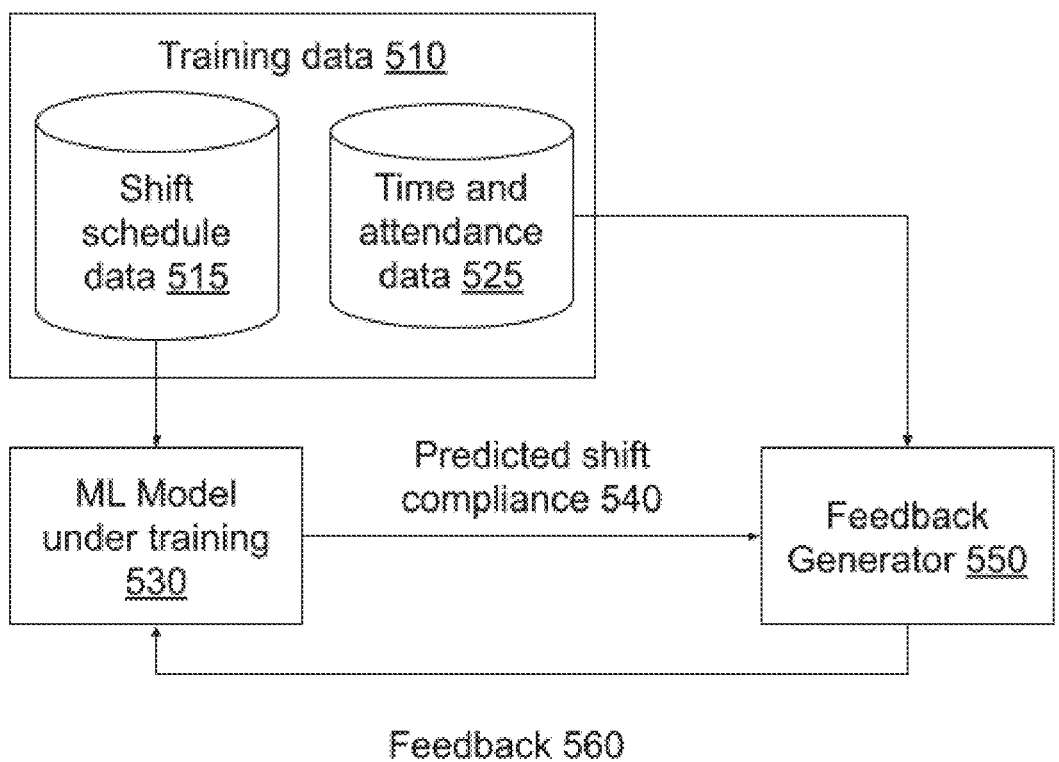
FIG. 5 is a block diagram illustrating an example of supervised machine learning for prediction of problem shifts, in accordance with some implementations.

FIG. 5 is a block diagram illustrating an example of supervised machine learning for prediction of problem shifts, in accordance with some implementations.

The supervised machine learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised machine learning is used to train a machine learning (ML) model 530 based on training data 510 and a feedback generator 550. ML model 530 may be implemented using any suitable machine learning technique, e.g., a feedforward neural network, a convolutional neural network, or any other suitable type of neural network. In some implementations, other machine learning techniques such as Bayesian models, support vector machines, hidden Markov models (HMMs), etc. can also be used to implement ML model 530.

The training data 510 includes shift schedule data 515 and time and attendance data 525 for a plurality of shift schedules. The shift schedule data may be similar to, for example, the shift schedule data described with respect to FIG. 2. The time and attendance data (ground truth data) may be obtained from one or more employer or service provider computer systems. In some implementations, the ground truth data may be provided via manual intervention.

In this illustrative example, shift schedule data 515 are provided to a machine learning (ML) model under training 530. The ML model generates a prediction of shift compliance 540 based on a current state of the ML model and the shift schedule data.

Analysis based on individual components of the schedule data can lead to inaccurate determination of a shift compliance metric. Instead, analysis of the schedule data when considered as a whole can lead to likely accurate determination of shift compliance metric (odds). For example, when analyzing data from a single site or location of an employer, it may be inaccurate to infer some data patterns because the problem shift behavior may be due to an errant employee, and not due to the nature of the shift. Similarly, an incorrect inference may be made about a particular employee when the pattern is actually systemic and observed for all industries in a location, or for multiple locations for a particular industry, or for a particular season, etc. The features are utilized by the ML model to cluster the schedule data and generate shift compliance metrics associated with each type of shift.

Stated another way, the shift schedule data may be used to determine specific features that may be used to determine a probability of shift compliance. For example, a day and time of shift may provide signals about a likelihood that the scheduled employee may be absent from the scheduled shift. For example, an industry type may also provide signals about a likelihood that the scheduled employee may be absent from the scheduled shift.

For example, the ML model may determine a feature vector based on features of shift schedule data 515. The feature vector may be a mathematical, multi-dimensional representation generated based on the shift schedule data 515. Different shifts may have different feature vectors, based on respective shift schedule data. Upon training, the ML model generates similar feature vectors for similar shifts (shifts that are associated with similar types of shift attributes, e.g., industry type, time of day, etc.).

The ML model is utilized to process the different signals determined based on the scheduled data. An internal coherence of the different signals may be utilized to determine predicted shift compliance.

The predicted shift compliance 540 is provided to feedback generator 550.

Feedback generator 550 is also provided with the groundtruth tags based on time and attendance data (e.g., whether the scheduled employee was present for the shift or not) 525 corresponding to the shift. Feedback 560 is generated by feedback generator 550 based on a comparison of the predicted shift compliance with the actual time and attendance data, e.g., whether the shift was an unscheduled shift or not, etc. The feedback 560 is provided to the ML model under training, which may be updated based on the received feedback. For example, if predicted shift compliance 540 is similar to time and attendance data 525, positive feedback may be provided as feedback 560, while if they are dissimilar negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

In some implementations, different types of ML models may be utilized to process different categories of shift schedule data and identify characteristic features in each category of shift scheduled data. For example, a k-nearest neighbor (kNN) model may be utilized to process the industry identifier, and a binomial logistic regression may be utilized for the shift time and date, etc. The identified features may then be processed by a different ML model that operates on these intermediate outputs as its inputs to generate the predicted shift compliance.

The training of the ML model may be performed periodically at specified intervals, or be triggered by events. In some implementations, the training may be repeated until a threshold level of shift compliance accuracy is reached.

In some implementations, the ML model is a neural network. In some implementations, the ML model may include one or more of binary classification, multiclass classification, and regression. In some implementations, the ML model may be a K-means model, kNN model, Linear Regression model, Logistic Regression model, Decision Tree model, SVM model, Naive Bayesian model, Random Forest model, etc.

In some implementations, problem shift data created with human intervention may be validated by the ML model to ensure accuracy of shift classification.

Figure 6A:
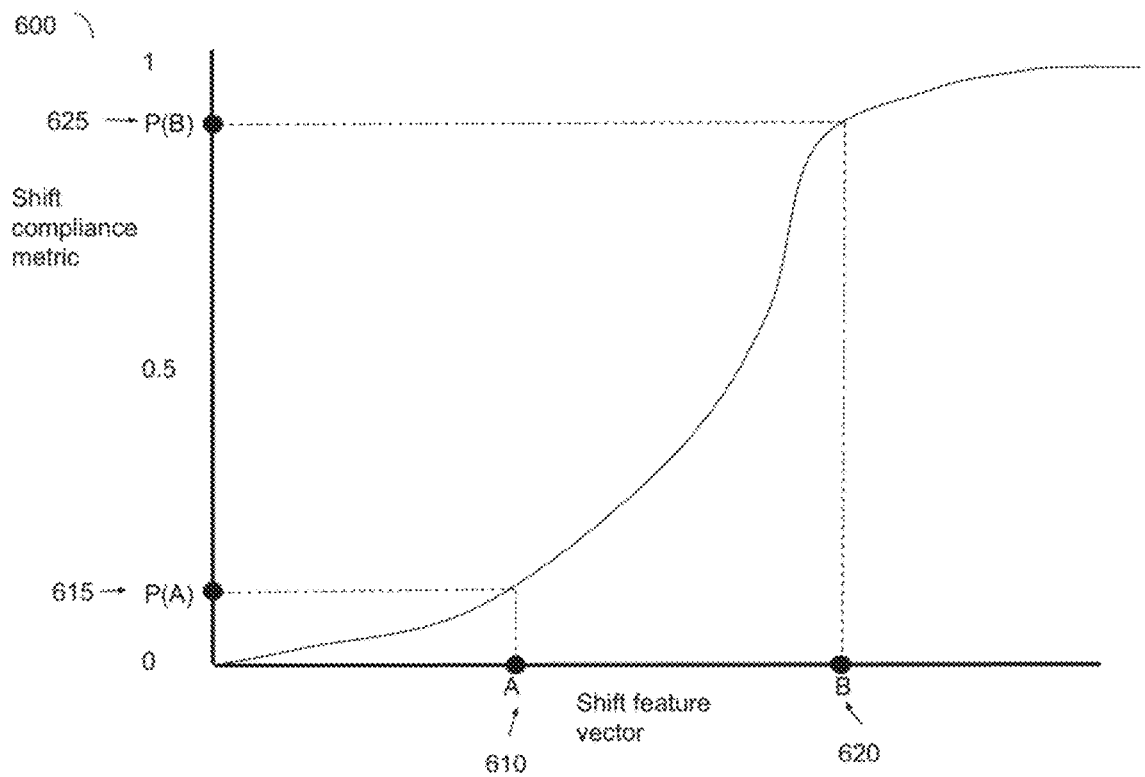
FIG. 6A illustrates example logistic regression based odds of problem shifts generated based on a trained machine learning (ML) model, in accordance with some implementations.

FIG. 6A illustrates an example graph of logistic regression based odds of problem shifts generated as a function of shift attributes (shift feature vector) based on a trained machine learning (NIL) model, in accordance with some implementations.

FIG. 6A depicts an example shift compliance metric plotted as a function of shift attribute for a particular shift. In this illustrative example, the 2-d graph includes a visualization of a shift attribute(s) along the X-axis, and the shift compliance metric along the Y-axis, which is the probability of a particular shift associated with that shift attribute being a shift where the scheduled employees attend the particular shift.

As an example, for a shift corresponding to point A (610), the shift compliance metric, the odds of a scheduled employee not missing the shift, P(A) (615) is about 0.12. Similarly, for point B 620, the compliance metric, or P(B) 625 may be about 0.9.

Decision boundaries may be utilized to characterize the shifts into one or more cluster types. For example, decision boundaries may be selected at 0.25, 0.5, and 0.75 to determine an indicator of a difficulty to fill a slot/shift compliance.

This may be generated for different industries, locations, job types within an employer, seasons, etc.

Figure 6B:
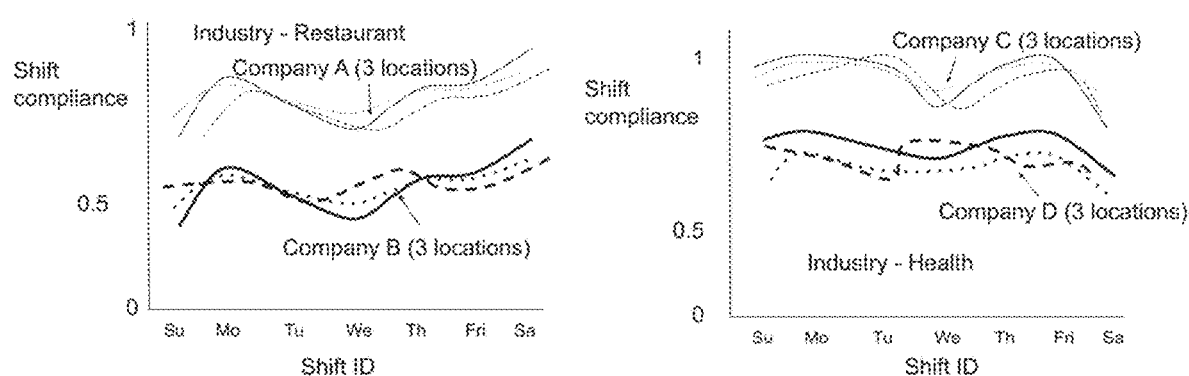
FIG. 6B illustrates example logistic regression based odds of problem shifts generated based on a trained machine learning (ML) model, in accordance with some implementations.

FIG. 6B illustrates example logistic regression based odds of problem shifts generated based on a trained machine learning (ML) model, in accordance with some implementations.

In this illustrative example, shift compliance metrics are visualized for different employers (companies) from different industries. The shift compliance metrics may be determined, for example, using a method similar to method 400, described with respect to FIG. 4.

FIG. 6B depicts two illustrative examples of plots of shift compliance metrics as a function of shift ID for two example companies from two different industries.

A first graph depicts shift compliance metrics as a function of shift ID (plotted as shifts for days of the week in sequence) for two companies, Company A and Company B from the restaurant industry.

As can be inferred, Company A is observed to generally have a higher shift compliance metric when compared to Company B. While there are variations at different locations of the respective companies, the trends across both companies indicate some similarities. A lower shift compliance is observed on the Sunday shifts, an increase for Monday/Tuesday shifts, another trough for the Wednesday shifts, and a relatively high shift compliance over the weekend. While this is only an illustrative example, this observation may be correlated to general patterns observed in the restaurant industry, where occupancy can tend to be higher on the weekends, with likely better revenue and tip collections.

A second graph depicts shift compliance metrics as a function of shift ID (plotted as shifts for days of the week in sequence) for two companies, Company C and Company D from the restaurant industry.

As can be inferred, Company C is observed to generally have a higher shift compliance metric when compared to Company D, and companies can be observed to have higher shift compliance metrics when compared to companies from the restaurant industry described earlier.

The trends for both Company C and Company D reflect a higher shift compliance metric for the shifts on Monday/Tuesday, and a lower shift compliance as the weekend approaches.

In some implementations, visualization of trends across employers, industries, etc. may be generated and provided/highlighted to one or more users of an employer system.

It will be appreciated that the examples depicted in FIG. 6A-6B are purely illustrative, and actual shift compliance metrics values will be based on the actual shift compliance metrics values that are determined based on schedule data and time and attendance data that is processed by, for example, method 400 described with reference to FIG. 4.

Figure 7:
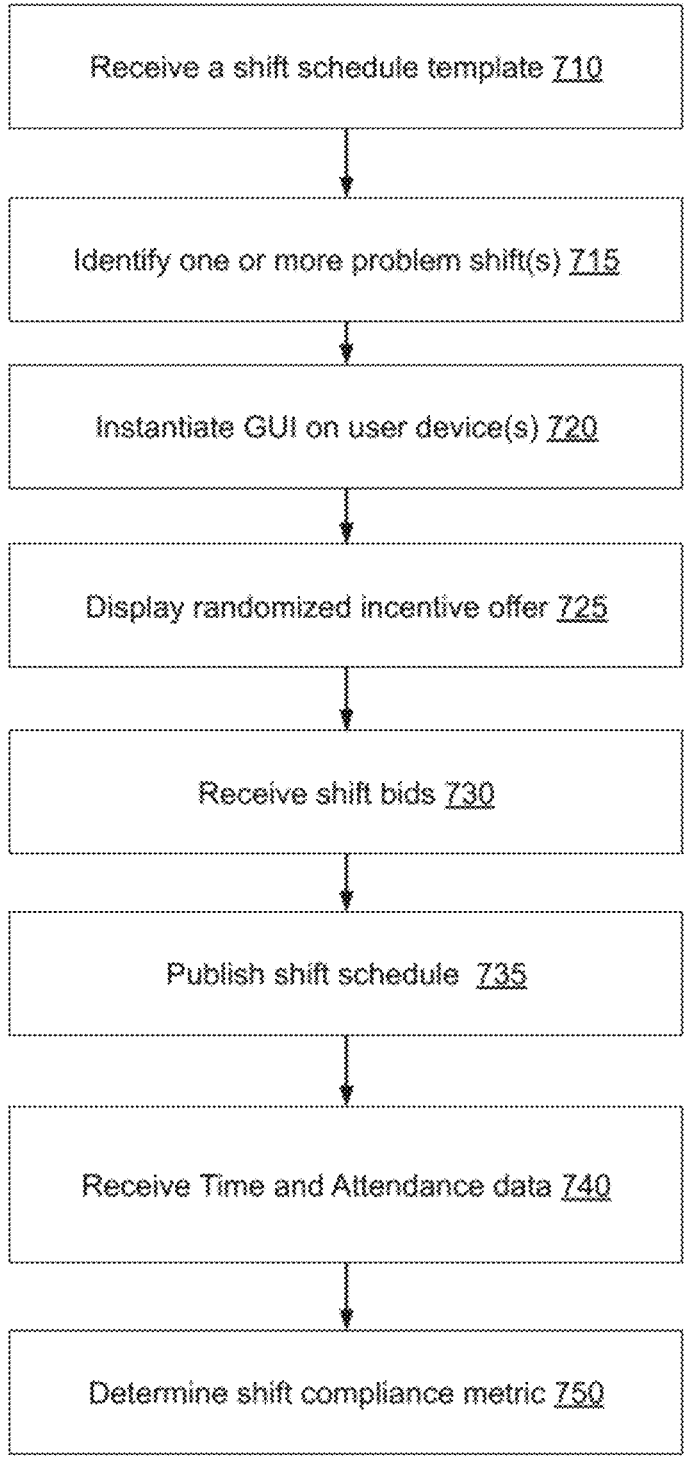
FIG. 7 is a flowchart illustrating an example method to perform a randomized testing of incentives for problem shifts, in accordance with some implementations.

FIG. 7 is a flowchart illustrating an example method to perform a randomized testing of incentives for problem shifts, in accordance with some implementations. The method may be utilized, for example, to support evaluation of an incentive structure for resolving problem shifts.

In some implementations, method 700 can be implemented, for example, on application server 130 described with reference to FIG. 1A. In some implementations, some or all of the method 700 can be implemented on one or more user devices 140 as shown in FIG. 1A, or on one or more server device(s) 130, and/or on a combination of developer device(s), server device(s) and client device(s). In described examples, the implementing system includes one or more digital processors or processing circuitry ("processors"), and one or more storage devices (e.g., a datastore 125 or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., one or more requests from a triggering subsystem, e.g., another employer system 135 described with respect to FIG. 1A, to perform method 700, a predetermined time period having expired since the last performance of method 700, and/or one or more other conditions occurring which can be specified in settings read by the method.

Method 700 may begin at block 710. At block 710, a shift schedule template is received. In some implementations, the shift schedule template is a set of data records specifying a set of shifts (shift slots), and which includes scheduled employees that are scheduled to work the shifts. The shift schedule template may also include identifiers associated with a job type, and/or other policy or regulatory codes associated with the shift.

The shift schedule template may be automatically generated based on previous shift schedule history, one or more employee preferences about availability, and other business parameters such as expected customer demand, footfall, etc.

Block 710 may be followed by block 715.

At block 715, one or more problem shifts in the received template are identified.

In some implementations, the identification of the one or more problem shifts is performed by comparing the shift attributes in the received template against an already created record (table) of problem shifts and/or corresponding shift attributes generated from an ML model. The record may be created from previously generated shift compliance metric values and by applying a suitable decision boundary.

For example, a distance may be computed between one or more of the shift attributes in the received shift schedule template and shift attributes of representative problem shifts that have been previously determined. A shift in the received shift schedule template may be assigned to a category with the least distance.

In some implementations, a table of problem shifts may be generated based on another technique, e.g., a list prepared using human action or intervention.

In some implementations, problem shift(s) in the shift templates are identified by determining a shift compliance metric based on the shift attributes in the shift template, and by comparing the determined shift compliance metric with predetermined thresholds.

Block 715 may be followed by block 720.

At block 720, a graphical user interface (GUI) is initiated and/or caused to be initiated on one or more user device(s) to highlight an incentive associated with each of the identified problem shifts. In some implementations, the GUI may be initiated soon after identification of a problem shift. In some implementations, a notification may be transmitted to one or more user devices, and the GUI activated when a user opens an App or window associated with an employer communication system.

As described earlier, a user interface may be utilized via an employee communication system/channel on one or more user devices associated with employees/contractors/hourly workers. A custom application may be utilized for this purpose and other workplace engagement.

Figure 8:
FIG. 8 depicts an example user interface of an employee communication system, in accordance with some implementations.

FIG. 8 depicts an example user interface of an employee communication system, in accordance with some implementations.

The engagement tool (app) enables functions such as Chirp, Earn, Rewards, and Training. Buttons are provided for the user to navigate to various functions that enable employees, workers to access additional features, e.g., earned wage access, savings options, planning tools, etc.

A chirp feature (830) enables users to communicate with other employees as groups or directly. A user may communicate via the tool with other employee users on a 1:1 basis. Group communications may also be enabled that enables groups of users to communicate on a N:N basis. A user may create new groups, based on their interests, job role(s), affiliations, etc. Supervisors may create groups that automatically enroll all employees of a certain group. In some implementations, information may be verified using an employee database to determine eligibility etc.

An earn feature is provided that enables users to view their current schedule, available jobs/shifts, etc. A rewards feature enables the user to receive incentives related to milestones and/or other achievements. e.g., birthdays, anniversaries, successful completion of training, etc. A training feature enables users to select and undergo both mandatory and optional job related training, etc.

Figure 9:
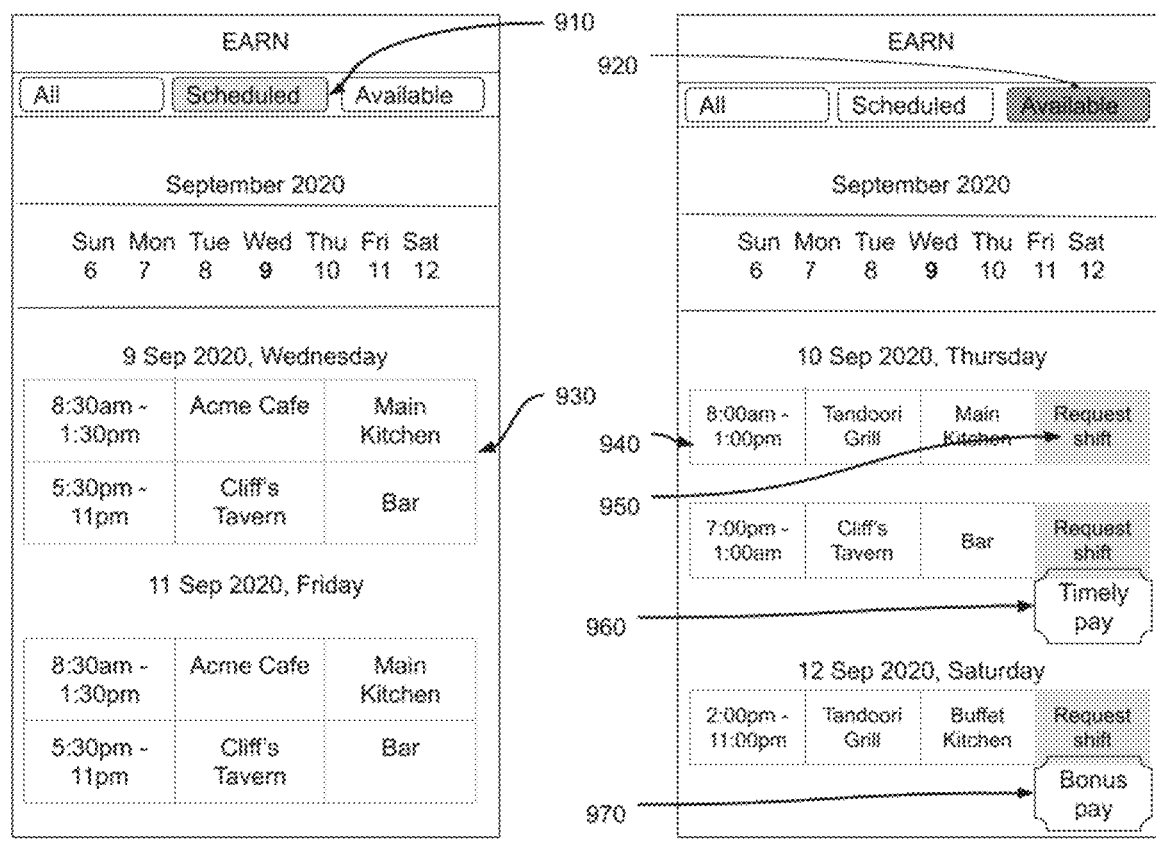
FIG. 9 depicts an example user interface of an employee communication system, in accordance with some implementations.

FIG. 9 depicts an example user interface of an employee communication system, in accordance with some implementations.

The user interface enables a user to view their current schedule (910), as well as available jobs/shifts (920). In some cases, available shifts are indicated/displayed as shift cards (940) to the user based on employee eligibility.

In some implementations, incentive offers that may be applicable to particular shifts may also be indicated alongside the shift. This enables users to select particular shifts, and may enable an employer to fill certain hard to fill shifts.

For example, a first shift 940 has no associated incentive, a second shift 960 may be associated with a timely pay incentive offer, and a third shift 970 may be associated with a bonus pay incentive offer.

A button 950 may be provided that enables a user to request a shift that they are not currently scheduled for. Upon selection of the button, a request may be transmitted, for example, to Application Server 130 and/or scheduling system 120.

Figure 10:
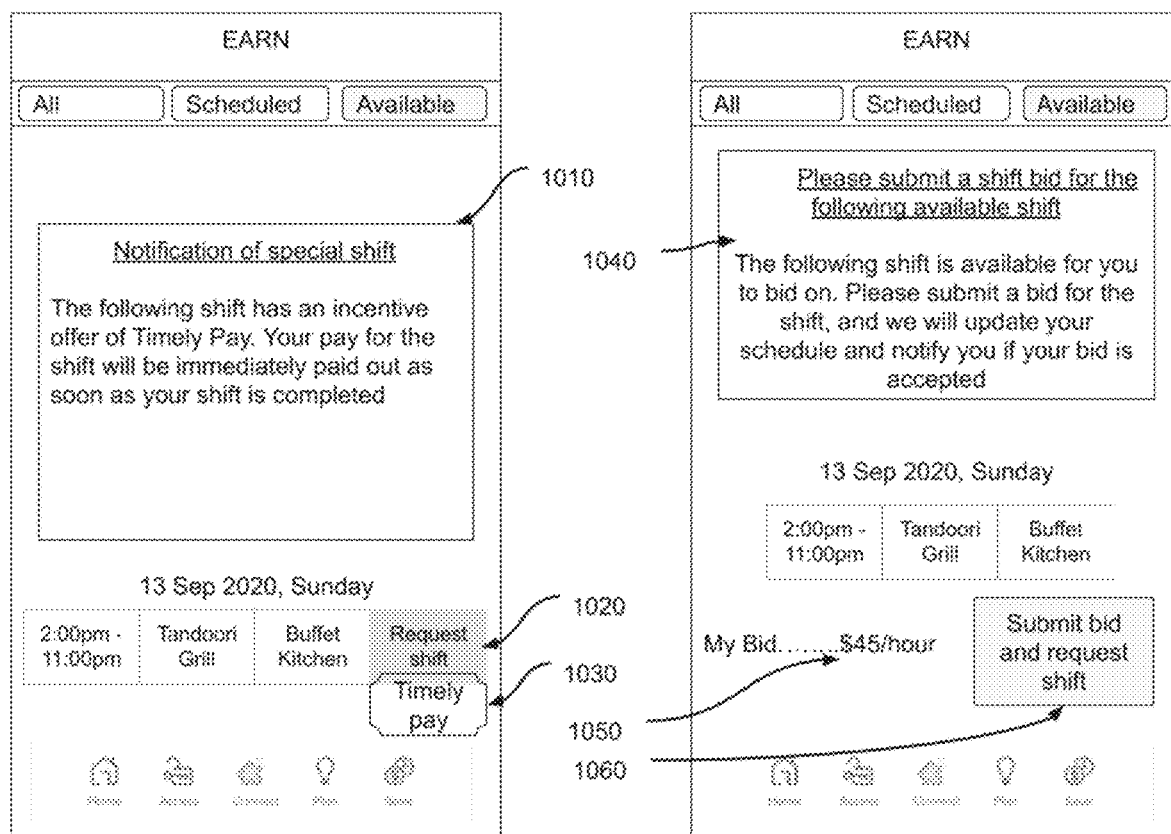
FIG. 10 depicts an example user interface of an employee communication system, in accordance with some implementations.

FIG. 10 depicts an example user interface of an employee communication system, in accordance with some implementations.

In some implementations, additional notifications may be provided to users/employees based on detection of a problem shift in a shift schedule template or a published shift schedule (e.g., due to an employee calling-off a scheduled shift, etc.). A notification of availability of a special shift 1010 may be displayed on a user device, along with details of the shift 1020, and a type of incentive offer 1010 associated with the special shift. The user may request a special shift via the user interface.

In some implementations, an incentive offer for a special shift may enable a user to bid on the shift and specify their own bid rate for the shift.

In this illustrative example, a user is provided with a notification 1040 regarding a special shift that the user is eligible to bid on. Details of the shift, e.g., time of shift, job type, location, etc. are provided to the user. The user is enabled to submit their own bid 1050 for the shift, and request 1060 the shift.

As described earlier, in some implementations, a real-time notification is sent to a user device and immediately displayed on the user device, whereas in some other implementations, a notification is transmitted to a user device, and initiated when a suitable screen/app is viewed by the user.

Block 720 may be followed by block 725.

At block 725, a randomized incentive offer is displayed or transmitted to multiple user devices. The randomized incentive offer may include one or more of a timely pay offer and a bonus pay offer.

As part of a timely pay offer, a user is paid immediately upon completion of a shift associated with a timely pay offer, as opposed to an end of a pay period, which may be a usual time of settlement of employee earnings.

As part of a bonus pay offer, a user may be paid an amount that is higher than the usual wage they would earn for the shift. A bonus pay offer may be indicated as a percentage increase over a normal age, or as a fixed (higher) amount.

In some implementations, the selection of incentive offers is based on a determination of clusters of types of problem shifts. Selection of clusters for randomized offers is made such that similar groups (clusters) of shift slots (e.g. night shifts, long weekend shifts, weekday shift slots in a restaurant industry, etc.) are offered different types of incentive offer(s) to test the sensitivity of shift compliance to the incentive offers.

In some implementations, a number of randomized incentive offers is based on an expected number of unscheduled shifts. For every shift, a reference shift schedule data set is utilized without any incentive offers as well as data sets with different combinations of incentive offers.

Block 725 may be followed by block 730.

At block 730, shift bids may be received from a set of users via one or more of the plurality of user devices.

Block 730 may be followed by block 735.

At block 735, a shift schedule may be finalized (published) based on the received shift bids. eligibility verified, regulatory, overtime, etc. prioritization based on performance, other factors when finalizing Block 735 may be followed by block 740.

At block 740, time and attendance data associated with the published shift schedule is received.

In some implementations, time and attendance data may be received upon completion of the corresponding shifts. In some other implementations, the time and attendance data may be received after completion of a certain number of shifts, e.g., daily, weekly, bi-weekly, etc.

Block 740 may be followed by block 750.

At block 750, a shift compliance metric is determined for the shift schedule data associated with the randomized incentive offers by comparing with the corresponding time and attendance data. Historical shift schedule data associated with the shift schedule data associated with the randomized incentive offers is obtained, for example, from data store 125. An updated shift compliance metric is determined and statistically analyzed along with the time and attendance data, the historical problem shift data, and the published shift schedule to determine a shift compliance metric associated with the randomized incentive.

In some implementations, a lift value associated with the randomized incentive offer is determined.

In some implementations, a lift value for a particular shift is based on a measured change in the logistical regression values with and without a randomized incentive offer. In some implementations, a logistic regression function is determined for each category of shifts, e.g., no incentive offer, timely pay shifts, bonus pay shifts, etc. A lift associated with the randomized incentive offer is based on a distance measured between respective points on the logistics regression curve (evaluated by the determined logistic regression function for each randomized incentive offer) corresponding to a particular shift.

In some implementations, the life is measured by a combination of shift compliance as well as customer satisfaction data corresponding to shifts for which randomized incentives were offered.

In some implementations, statistically analyzing the time and attendance data, the historical problem shift data, and the published shift schedule may include measuring a distance of movement of a centroid of each cluster of a plurality of clusters of problem shifts.

Upon completion of the shift(s) indicated in the randomized incentive offer(s), the incentive offers are fulfilled.

An ML model, e.g., similar to an ML model described with reference to FIG. 4 may be updated with the shift compliance metric associated with the randomized incentive offer(s). Attributes associated with each incentive offer may be added as a dimension to a feature vector(s) for the corresponding schedule data and/or time and attendance data.

Method 700, or portions thereof, may be repeated any number of times using additional inputs. In another example, block 710-750 may be repeated with additional incentive offers. Method 700 may be repeated until a threshold level of shift compliance is reached, or a threshold lift from a randomized incentive offer is measured.

In some implementations, method 700, or portions thereof, may be repeated periodically. For example, method 700, or portions thereof may be repeated to retrain the ML model daily, weekly, monthly, etc. In some implementations, method 700, or portions thereof, may be repeated based on a change in season, new employer addition, new policy changes, etc.

Figure 11A:
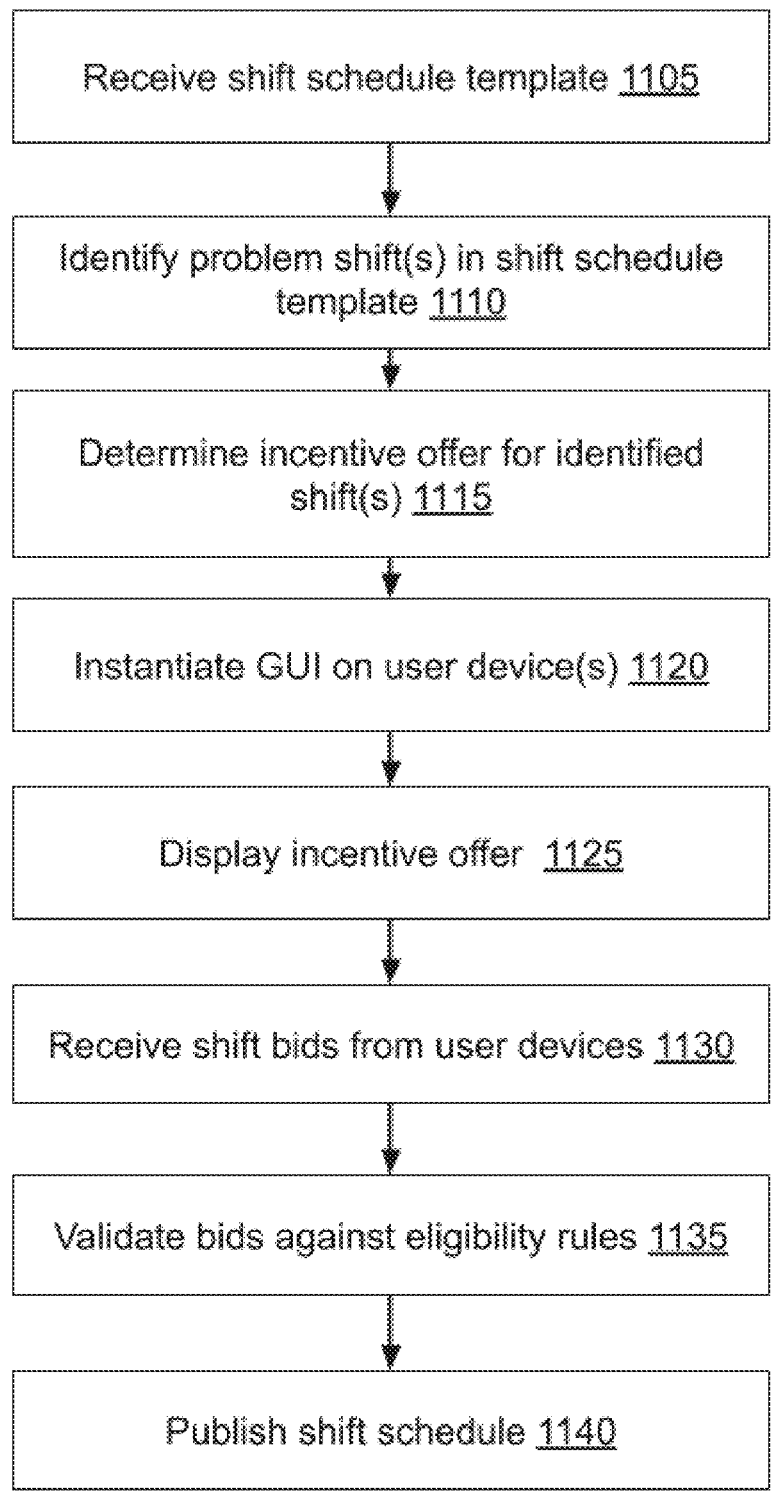
FIG. 11A is a flowchart illustrating an example method to automatically improve shift coverage for problem shifts, in accordance with some implementations.

FIG. 11A is a flowchart illustrating an example method to automatically improve shift coverage for problem shifts, in accordance with some implementations.

In some implementations, method 1100 can be implemented, for example, on application server 130 described with reference to FIG. 1A. In some implementations, some or all of the method 1100 can be implemented on one or more user devices 140 as shown in FIG. 1A, or on one or more server device(s) 130, and/or on a combination of server device(s), and user device(s). In described examples, the implementing system includes one or more digital processors or processing circuitry ("processors"), and one or more storage devices (e.g., a datastore 125 or other storage). In some implementations, different components of one or more servers and/or clients can perform different blocks or other parts of the method 1100. In some examples, a first device is described as performing blocks of method 1100. Some implementations can have one or more blocks of method 1100 performed by one or more other devices (e.g., other client devices or server devices) that can send results or data to the first device.

In some implementations, the method 1100, or portions of the method, can be initiated automatically by a system. In some implementations, the implementing system is a first device. For example, the method (or portions thereof) can be periodically performed, or performed based on one or more particular events or conditions, e.g., one or more requests from a triggering subsystem, e.g., another employer system 135 described with respect to FIG. 1A, to perform method 1100, a predetermined time period having expired since the last performance of method 1100, and/or one or more other conditions occurring which can be specified in settings read by the method.

At block 1105, a shift schedule template is received. In some cases, the template may be a provisional shift schedule prepared for shift finalization.

In some implementations, the shift schedule template may be a set of data records specifying a set of shift slots and includes a listing of scheduled employees that are scheduled to work the shifts. The shift schedule template may also include identifiers associated with a job type, and/or other policy or regulatory codes/rules associated with the shift.

In some implementations, the shift schedule template may include only a listing of shift slots, and the shift requirements associated with each shift slot. A separate data store or data records may include a list of available employees and corresponding shifts requested by one or more employees.

The shift schedule template may be automatically generated based on previous shift schedule history, one or more employee preferences about availability, and other business parameters such as expected customer demand, footfall, etc.

Block 1105 may be followed by block 1110.

At block 1110, one or more potential problem shifts may be identified in the shift schedule template.

In some implementations, the identification of the one or more problem shifts is performed by comparing the shift attributes in the received template against an already created record (table) of problem shifts and/or corresponding shift attributes generated from an ML model. The record may be created from previously generated shift compliance metric values and by applying a suitable decision boundary.

For example, a distance may be computed between one or more of the shift attributes in the received shift schedule template and shift attributes of representative problem shifts that have been previously determined. A shift slot in the received shift schedule template may be assigned to a category with the least distance.

In some implementations, a table of problem shifts may be generated based on another technique, e.g., from a list prepared using human action or intervention. In some implementations, a table of problem shifts may include shifts determined to be likely problem shifts based on expected future events, e.g., weather events, special events such as sports games, festivals, etc.

In some implementations, problem shift(s) in the shift templates are identified by determining a shift compliance metric based on the shift attributes in the shift template and comparing the determined shift compliance metric with predetermined thresholds.

Block 1110 may be followed by block 1115.

At block 1115, an incentive offer may be determined for each identified problem shift. In some implementations, the incentive offer is based on determining an incentive offer associated with a greatest distance between the shift compliance metric computed for a control group (e.g., with no incentive offer), and a shift compliance metric computed for a group where the corresponding incentive offer was made (and accepted).

In some implementations, an incentive offer for a problem shift may be determined based on the logistic regression odds computed for the problem shift, as described earlier.

In some implementations, the incentive offer may be a bonus pay offer, which is an offer to an employee on an amount that is greater than a customary pay, and an amount associated with the bonus pay offer is based on a logistic regression value associated with the problem shift. In some implementations, an incentive offer of bonus pay is determined based on a logistic regression value and a budget provided for that shift by an employer.

In some implementations, the incentive offer may be a timely pay offer.

In some implementations, the incentive offer may be an invitation to users to submit a shift bid (e.g., a "name your price" type shift bid).

Block 1115 may be followed by block 1120.

At block 1120, a graphical user interface (GUI) portion is instantiated on a plurality of user devices. The GUI is utilized to highlight an incentive associated with each of the identified problem shifts.

In some implementations, the GUI may be instantiated later, and only a notification is sent to the user device, and the GUI is launched (instantiated) when the app is initiated.

Block 1120 may be followed by block 1125.

At 1125, the incentive offer for each of the identified problem shifts is displayed via the GUI. In some implementations, a reception level may be determined for each incentive offer based on a count of users that view one or more incentive offers.

In some implementations, a reception level may be determined for the incentive offer. The reception level may be based on a number (count) of users that are actively participating, e.g., viewing notifications, etc. The reception level may be indicative of a level of active participation by employees.

The reception level may be determined over different virtual and/or geographical zones. For example, the reception level may be determined for participants who are located within a certain distance of the establishment and be indicative of a level of reception in a localized region (e.g., all employees/users located in a certain state, city, or country, etc.).

Virtual zones defined by categories, e.g., new employees, experienced employees e.g. employees that have been employed for a period that exceeds a certain time period, new employees, etc. may be determined.

In some implementations, a reception level (or listenership/listen rate) may be determined for different categories of users, e.g., employees that meet a threshold level of experience, employees that meet a threshold performance rating, employees that meet a threshold level of unscheduled shift attendance, employees that fulfil a minimum criterion for the corresponding shift, etc.

Block 1125 may be followed by block 1130.

At block 1130, shift bids are received from each of a set of users via one of more user devices of the plurality of user devices.

As described earlier, a user interface may be provided on a user device associated with an employee that enables a user to submit a shift bid. In some implementations, a shift bid is an indication of acceptance of an incentive offer, e.g., timely pay, bonus pay, etc. by the user. In some implementations, a shift bid is indicative of a particular monetary amount, e.g., $45/hour, or a percentage, e.g., 20% bonus pay, that is entered by a user on a respective user device.

Block 1130 may be followed by block 1135.

At block 1135, received bids are validated against one or more eligibility rules in order to determine whether a shift bid is a valid shift bid. For example, a shift bid may be considered to be invalid if it is determined that completion of the proposed shift bid may cause a violation of one or more rules and/or policy guidelines, e.g., overtime policies, regulatory conditions, etc.

In some implementations, when multiple shift bids may be received for the same shift slot, the received shift bids may be evaluated for prioritization of the shift bids.

In some implementations, the prioritization may be based on the skillset of the employee and/or experience in the relevant field. In some implementations, the prioritization may be based on a time at which a bid for received (first come first serve basis), as an incentive for employees to submit their bids early.

In some implementations, a round robin algorithm may be applied to provide an opportunity to applicants who may have bid multiple times.

Block 1135 may be followed by block 1140.

At block 1140, a shift schedule is published (finalized) based on the shift schedule template and the received shift bids to generate a published shift schedule. A token may be included in one or more data records indicative of a type of incentive offer associated with each shift that is associated with an incentive offer.

In some implementations, valid shift bids that were not selected may be stored to be utilized as backups in case the scheduled employee cannot attend the selected shift slot.

In some implementations, upon publication (finalization) of the shift schedule, notifications may be provided to one or more employees, one or more supervisors/managers that includes details of the shifts they are associated with/assigned to.

In some implementations, finalization of a shift schedule may be communicated to users via a user interface of a user device, e.g., user device 140 described with reference to FIG. 1A.

At a time of availability of shift completion data, e.g., end of a shift time slot, end of day, end of week, end of pay period, etc., time and attendance data is received corresponding to one or more shifts in the published shifts, particularly for shifts which have incentive offers.

In some implementations, upon obtaining time and attendance data corresponding to the published shift schedule, a token associated with timely pay or other incentive offer(s) may be identified. Based on the identified token, one or more incentive offer(s) may be fulfilled. For example, all or a portion of earnings associated with the shift may be accelerated to the user based on user opt-in and designation of a financial instrument where the accelerated funds are to be loaded.

In some implementations, shift schedule data, incentive offer(s) data, and time and attendance may be stored on one or more storage devices, e.g., data store 125.

In some implementations, the reception level of one or more incentive offers may be compared to a first threshold level, and a count of received shift bids compared to a second threshold level. Based on a determination of a reception level meeting the first threshold level and the received shift bids meeting a second threshold level, one or more incentive offers may be adjusted. For example, if it is determined that for a shift slot with a high likelihood of becoming unscheduled (e.g., a night shift during a holiday weekend), a reception level of for one or more incentive offers(s) met a predetermined threshold (e.g., exceeded a predetermined number of users who viewed the message), but still did not receive a threshold number of valid shift bids, the incentive offer(s) may be adjusted so that they are more attractive to users. In some cases, updated incentive offers may be displayed, or caused to be displayed on the user devices, to attract additional valid shift bids.

In some implementations, incentive offers may be adjusted based on a particular shift not being confirmed by a predetermined threshold period of time before the commencement of the shift. For example, at a predetermined time before a shift, incentive offer(s) may be automatically transmitted to users if it is determined that the shift slot is not finalized, or if a last minute cancellation/call-off occurs.

Method 1100, or portions thereof, may be repeated any number of times using additional inputs. In another example, block 1105-1140 may be repeated with additional incentive offers. Method 1100 may be repeated until a threshold level of shift compliance is reached.

In some implementations, method 1100, or portions thereof, may be repeated periodically. In some implementations, method 1100, or portions thereof, may be repeated based on a change in season, newly received shift requirements, new employer addition, policy changes, etc.

Figure 11B:
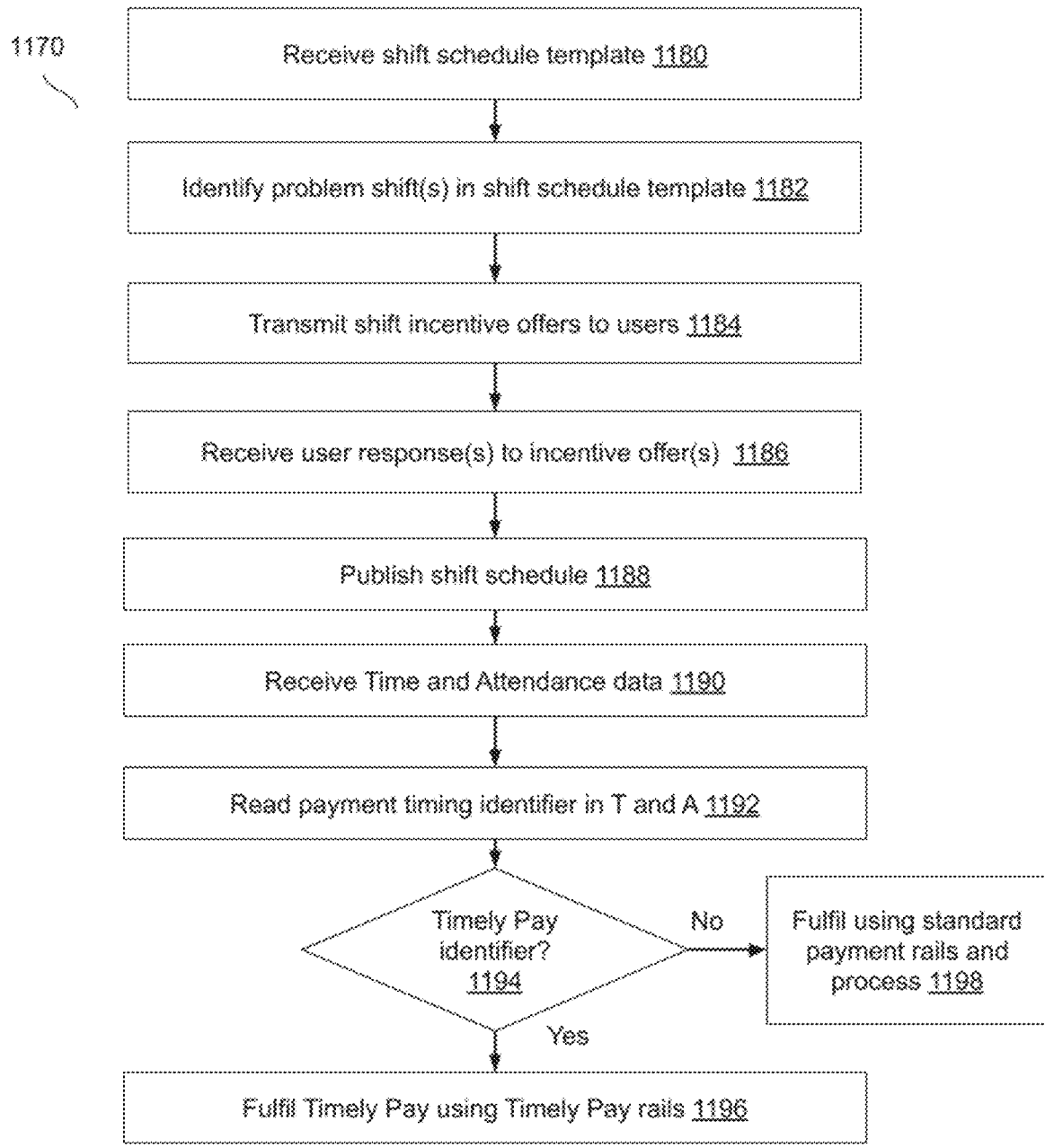
FIG. 11B is a flowchart illustrating an example method to automatically improve shift coverage for problem shifts, in accordance with some implementations.

FIG. 11B is a block diagram illustrating an example of a method to auto generate shift incentives, in accordance with some implementations.

At block 1180, a shift schedule template is received. In some cases, the shift schedule template is a provisional schedule prepared for finalization of a schedule.

Block 1180 may be followed by block 1182.

At block 1182, one or more problem shifts in the template are identified.

In some implementations, the identification of the one or more problem shifts is performed by comparing the shift attributes in the received template against an already created record (table) of problem shifts and/or corresponding shift attributes generated from an ML model. The record may be created from previously generated shift compliance metric values and by applying a suitable decision boundary.

For example, a distance may be computed between one or more of the shift attributes in the received shift schedule template and shift attributes of representative problem shifts that have been previously determined. A shift in the received shift schedule template may be assigned to a category with the least distance.

In some implementations, a table of problem shifts may be generated based on another technique, e.g. a list prepared using human action or intervention.

In some implementations, problem shift(s) in the shift templates are identified by determining a shift compliance metric based on the shift attributes in the shift template, and by comparing the determined shift compliance metric with predetermined thresholds.

Block 1182 may be followed by block 1184.

At block 1184, one or more incentive offers for identified problem shifts are transmitted to users. In some implementations, the incentive offers may be displayed on a user device associated with one or more eligible users.

Block 1184 may be followed by block 1186.

At block 1186, user response(s) are received to incentive offer(s). For example, user response(s) to incentive offer(s) may be received at application server 130 from user devices 140.

Block 1186 may be followed by block 1188.

At block 1188, a shift schedule is published based on the shift template and the received user response(s).

Block 1188 may be followed by block 1190.

At block 1190, time and attendance data corresponding to the published shift schedule is received.

Block 1190 may be followed by block 1192.

At block 1192, a payment timing identifier in the time and attendance data record is determined.

Block 1192 may be followed by block 1194.

At block 1194, it is determined whether a payment timing identifier is indicative of timely pay. If it is determined that the payment timing identifier is indicative of a timely pay incentive offer, then block 1194 may be followed by 1196, else block 1194 is followed by block 1198.

At block 1196, a timely pay is fulfilled by crediting an account associated with an employee of the shift, per the incentive offer indicated. Timely pay may be fulfilled by utilizing timely pay rails that provide connections with third party service providers and enable the transfer/loading funds on financial instruments such as bank account, support an instant load on a debit card, etc.

At block 1198, fulfillment follows normal payroll processing, e.g., where payment is made to an employee at the end of a pay period, etc.

Method 1170, or portions thereof, may be performed in a different order from that depicted in FIG. 11B. For example, blocks 1180-1188 may be performed at one time, and blocks 1190-1198 may be performed as a separate method, at a different time.

Figure 12:
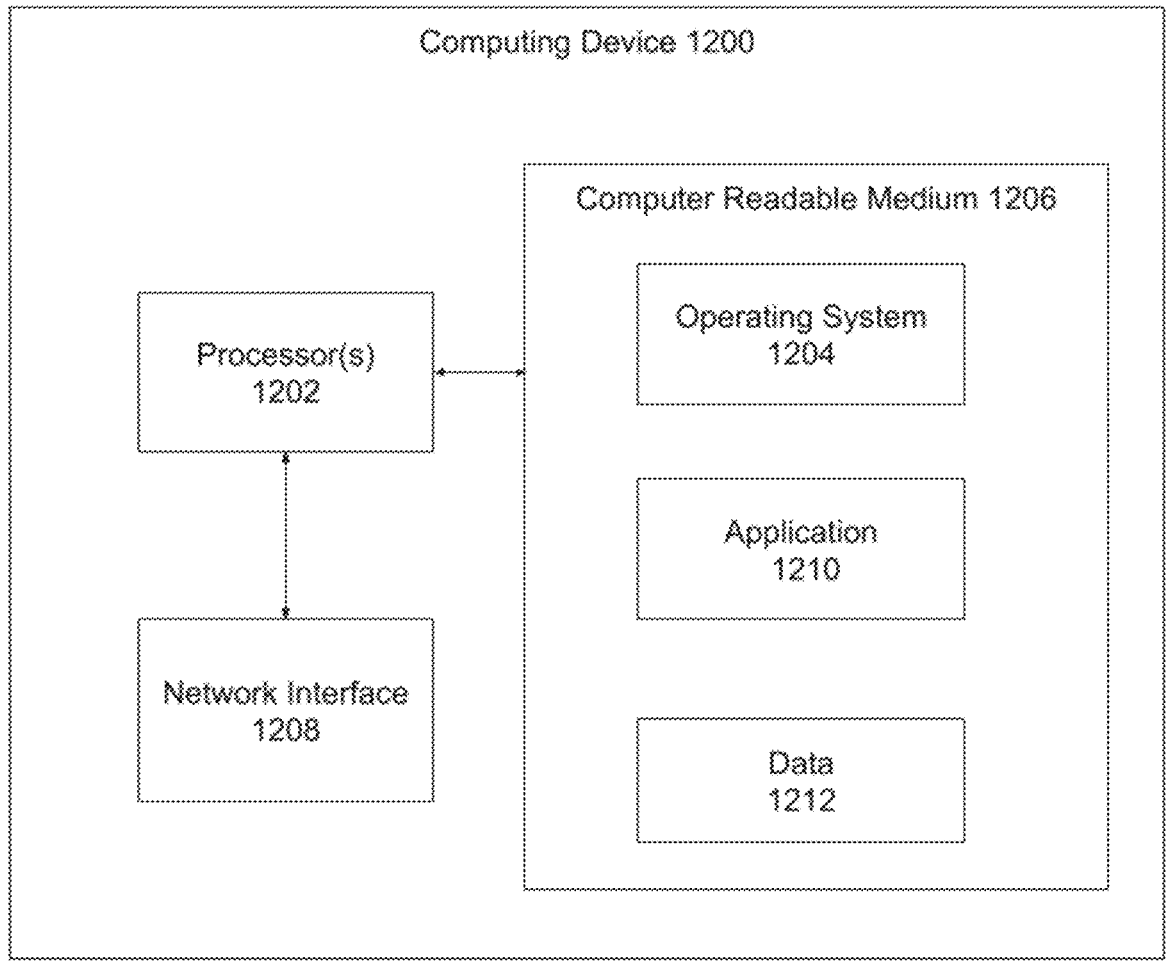
FIG. 12 is a block diagram illustrating an example computing device, in accordance with some implementations.

FIG. 12 is a block diagram of an example computing device 1200 which may be used to implement one or more features described herein. In one example, device 1200 may be used to implement a computer device (e.g., 130 and/or 140 of FIG. 1A), and perform appropriate method implementations described herein. Computing device 1200 can be any suitable computer system, server, or other electronic or hardware device. For example, the computing device 1200 can be a mainframe computer, desktop computer, workstation, portable computer, or electronic device (portable device, mobile device, cell phone, smartphone, tablet computer, television, TV set top box, personal digital assistant (PDA), media player, wearable device, etc.). In some implementations, device 1200 includes a processor 1202, a computer readable medium/memory 1206, and network interface 1208.

Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1206 is typically provided in device 1200 for access by the processor 1202, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1206 can store software operating on the server device 1200 by the processor 1202, including an operating system 1204, one or more applications 1210, and application data 1212. In some implementations, application 1210 can include instructions that enable processor 1202 to perform the functions (or control the functions of) described herein, e.g., some or all of the methods described with respect to FIGS. 4, 7, and 11A-B.

Elements of software in memory 1206 can alternatively be stored on any other suitable storage location or computer-readable medium. In addition, memory 1206 (and/or other connected storage device(s)) can store instructions and data used in the features described herein. Memory 1206 and any other type of storage (magnetic disk, optical disk, magnetic tape, or other tangible media) can be considered "storage" or "storage devices."

A network interface can provide functions to enable interfacing the server device 1200 with other systems and devices. For example, network communication devices, storage devices (e.g., memory and/or data store 125), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

Audio/video input/output devices may be provided that can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 12 shows one block for each of processor 1202 and memory 1206. These blocks may represent one or more processors or processing circuitries, operating systems, memories, I/O interfaces, applications, and/or software engines. In other implementations, device 1200 may not have all of the components shown and/or may have other elements including other types of elements instead of, or in addition to, those shown herein. While the Application server 130 is described as performing operations as described in some implementations herein, any suitable component or combination of components of Application server 130 or similar system, or any suitable processor or processors associated with such a system, may perform the operations described.

A user device can also implement and/or be used with features described herein. Example user devices can be computer devices including some similar components as the device 1200, e.g., processor(s) 1202, memory 1206, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video, for example, can be connected to (or included in) the device 1200 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 400, 700, and 11A-B) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to improve shift coverage, the method comprising:
   receiving a shift schedule template;
   identifying a plurality of problem shifts in the shift schedule template, wherein identifying a plurality of problem shifts comprises:
      obtaining a plurality of published shift schedules, each published shift schedule associated with a respective shift of a respective employer of one or more employers, wherein each published shift schedule includes a location attribute, industry code attribute, and week indicator attribute;
   for each published shift schedule, obtaining a corresponding historical time and attendance record; programmatically analyzing the published shift schedule and the corresponding historical time and attendance record to determine one or more unscheduled shifts; and adding unscheduled shift data associated with the one or more unscheduled shifts to a first training corpus, wherein the unscheduled shift data includes two or more of an employer identifier, a location identifier, an industry identifier, an employee identifier, a job type identifier; and applying a machine learning (ML) model to the first training corpus to identify the plurality of problem shifts by identifying shifts that lie at a threshold Hamming distance from a centroid of a cluster of problem shifts;

determining, using the machine learning model, a randomized incentive offer for each problem shift;

instantiating a graphical user interface (GUI) portion on a plurality of user devices;

displaying the randomized incentive offer for each of the identified problem shifts via the GUI;

receiving shift bids from each of a set of users via one of more user devices of the plurality of user devices;

measuring a lift value associated with the randomized incentive offer;

adjusting a shift schedule based on the received shift bids to generate a published shift schedule;

determining, based on the adjusted shift schedule, a shift compliance metric;

updating feature vectors based on the shift compliance metric;

creating a second training corpus based on the updated feature vectors; and retraining the ML model using the second training corpus until a threshold level of shift compliance is reached.

2. The computer-implemented method of claim 1, further comprising:

obtaining time and attendance data corresponding to the published shift schedule;

identifying a token associated with timely pay; and accelerating payment to a user based on the identified token.

3. The computer-implemented method of claim 1, wherein the incentive offer is a bonus pay offer, and wherein an amount associated with the bonus pay offer is based on a logistic regression value associated with the problem shift.

4. The computer-implemented method of claim 1, further comprising providing a graphical user interface (GUI) on a user device of an employee, wherein the GUI enables a user to submit a shift bid.

5. The computer-implemented method of claim 4, wherein the shift bid is an indication of acceptance of the incentive offer by the user.

6. The computer-implemented method of claim 1, further comprising:

calculating a reception level for the each incentive offer based on a count of users that view one or more incentive offers.

7. The computer-implemented method of claim 6, further comprising:

comparing the reception level for a particular shift to a first threshold level;

comparing received shift bids for the particular shift to a second threshold;

based on a determination of a reception level meeting the first threshold and the received shift bids meeting a second threshold level;

determining an updated incentive offer;

and displaying the updated incentive offer on the user devices.

8. A system comprising:

a memory with instructions stored thereon; and a processing device, coupled to the memory, the processing device configured to access the memory and execute the instructions, wherein the instructions cause the processing device to perform operations including:

receiving a shift schedule template;

identifying a plurality of problem shifts in the shift schedule template, wherein identifying a plurality of problem shifts comprises:

obtaining a plurality of published shift schedules, each published shift schedule associated with a respective shift of a respective employer of one or more employers, wherein each published shift schedule includes a location attribute, industry code attribute, and week indicator attribute;

for each published shift schedule, obtaining a corresponding historical time and attendance record; programmatically analyzing the published shift schedule and the corresponding historical time and attendance record to determine one or more unscheduled shifts; and adding unscheduled shift data associated with the one or more unscheduled shifts to a first training corpus, wherein the unscheduled shift data includes two or more of an employer identifier, a location identifier, an industry identifier, an employee identifier, a job type identifier; and applying a machine learning (ML) model to the first training corpus to determine the plurality of problem shifts by identifying shifts that lie at a threshold Hamming distance from a centroid of a cluster of problem shifts;

determining, using the machine learning model, a randomized incentive offer for each problem shift;

instantiating a graphical user interface (GUI) portion on a plurality of user devices;

displaying the randomized incentive offer for each of the identified problem shifts via the GUI;

receiving shift bids from each of a set of users via one of more user devices of the plurality of user devices;

measuring a lift value associated with the randomized incentive offer;

adjusting a shift schedule based on the received shift bids to generate a published shift schedule;

determining, based on the adjusted shift schedule, a shift compliance metric;

updating feature vectors based on the shift compliance metric;

creating a second training corpus based on the updated feature vectors; and retraining the ML model using the second training corpus until a threshold level of shift compliance is reached.

9. The system of claim 8, wherein the operations further comprise:

obtaining the historical time and attendance data corresponding to the published shift schedule;

identifying a token associated with timely pay; and accelerating payment to a user based on the identified token.

* * * * *